(12) United States Patent
Inaguma et al.

(10) Patent No.: US 7,401,516 B2
(45) Date of Patent: Jul. 22, 2008

(54) VIBRATION GYRO SENSOR ELEMENT WITH CANTILEVER VIBRATOR EXTENDING FROM SUBSTRATE AND POSITIONED WITHIN OPENING IN SUBSTRATE

(75) Inventors: Teruo Inaguma, Miyagi (JP); Junichi Honda, Miyagi (JP); Takashi Tamura, Miyagi (JP); Kazuo Takahashi, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/734,459

(22) Filed: Apr. 12, 2007

(65) Prior Publication Data

US 2007/0180910 A1    Aug. 9, 2007

Related U.S. Application Data

(62) Division of application No. 11/066,014, filed on Feb. 25, 2005, now Pat. No. 7,291,511.

(30) Foreign Application Priority Data

Mar. 8, 2004    (JP) ............................. 2004-064239

(51) Int. Cl.
*G01P 3/02* (2006.01)
*G01P 9/00* (2006.01)
*H01L 41/08* (2006.01)
(52) U.S. Cl. ................... 73/504.15; 73/504.12
(58) Field of Classification Search .............. 73/504.04, 73/504.12, 504.14, 504.15; 74/504.16, 504.02; 310/370
See application file for complete search history.

(56) References Cited

U.S. PATENT DOCUMENTS

| 5,574,219 | A | * | 11/1996 | Heinouchi | ............... 73/504.12 |
| 5,765,046 | A | * | 6/1998 | Watanabe et al. | ............. 396/53 |
| 6,018,212 | A | * | 1/2000 | Kikuchi et al. | .............. 310/321 |
| 6,799,461 | B2 | * | 10/2004 | Fujimoto et al. | ......... 73/504.16 |
| 7,168,289 | B2 | * | 1/2007 | Kikuchi | ...................... 73/1.37 |

FOREIGN PATENT DOCUMENTS

JP    06-042972    2/1994

(Continued)

OTHER PUBLICATIONS

Japanese Office Action issued On Jul. 31, 2007.

*Primary Examiner*—Helen C. Kwok
(74) *Attorney, Agent, or Firm*—Sonnenschein Nath & Rosenthal LLP

(57) ABSTRACT

A drive electrode to which a voltage for allowing a vibrator to vibrate is applied and first and second detection electrodes extending in the longitudinal direction of the vibrator in parallel to each other are formed as the upper electrode such that the drive electrode is interposed between the first and second detection electrodes and does not contact with the detection electrodes. In the case where there is a difference between the detection signals detected in the first and second detection electrodes when a voltage is applied between the lower electrode and drive electrode to allow the vibrator to vibrate at a vertical resonance frequency, a laser light is irradiated to a desired portion of the vibrator to apply grinding operation based on detection signals detected in the first and second detection electrodes, thereby adjusting the shape of the vibrator.

5 Claims, 28 Drawing Sheets

FOREIGN PATENT DOCUMENTS

| | | |
|---|---|---|
| JP | 08-327364 | 12/1996 |
| JP | 09-015033 | 1/1997 |
| JP | 10-213440 | 11/1998 |
| JP | 2003-121156 | 4/2003 |

* cited by examiner ideal cross-section example of cross-section obtained in the case of normal formation vibration state of vibrator having ideal cross-section vibration state of vibrator having asymmetric cross section

VIBRATION GYRO SENSOR ELEMENT WITH CANTILEVER VIBRATOR EXTENDING FROM SUBSTRATE AND POSITIONED WITHIN OPENING IN SUBSTRATE

RELATED APPLICATION DATA

This application is a divisional of U.S. patent application Ser. No. 11/066,014, filed Feb. 25, 2005 now U.S. Pat. No. 7,291,511, the entirety of which is incorporated herein by reference to the extent permitted by law. The present invention claims priority to Japanese Patent Application No. 2004-064239 filed in the Japanese Patent Office on Mar. 8, 2004, the entirety of which also is incorporated by reference herein to the extent permitted by law.

BACKGROUND OF THE INVENTION

1. Field of the Invention

The present invention relates to an angular rate sensor for use in video camera hand movement detection, motion detection in a virtual reality apparatus, direction detection in a car navigation system, or the like, and more particularly, to a method of manufacturing a small-sized vibration gyro sensor element having a cantilever vibrator, a vibration gyro sensor element, and a method of adjusting vibration direction.

2. Description of the Related Art

So-called a vibration-type gyro sensor (hereinafter, referred to as vibration gyro sensor) has now been widely used as an angular rate sensor for consumer use. The vibration gyro sensor allows a cantilever vibrator to vibrate at a predetermined resonance frequency and detects Coriolis force caused due to influence of an angular rate using a piezoelectric element, thereby detecting the angular rate.

The vibration gyro sensor is advantageous in its simple mechanism, short start-up time, and reduced manufacturing cost, and has now been incorporated in an electronic apparatus such as a video camera, virtual reality apparatus, or car navigation system, to serve as a sensor for hand movement detection, motion detection, direction detection, respectively.

As the electronic apparatuses in which the vibration gyro sensor is incorporated have become increasingly compact and higher performance, the vibration gyro sensor itself is required to be rendered compact and higher performance. For example, miniaturization is required to realize multi-functional electronic apparatus by combining the vibration gyro sensor with various sensors for use in other purposes and mounting them on a substrate.

However, since a vibrator of the vibration gyro sensor is manufactured by shaping a piezoelectric material obtained by a cutting process with machine work, processing accuracy in the manufacturing process cannot meet the requirement for the above miniaturization, so that desired performance cannot be obtained.

In order to cope with the problem, a piezoelectric vibration angular rate meter, that is, a vibration gyro sensor in which the vibrator is manufactured by forming a thin film made of a piezoelectric material on a single-crystal silicon substrate has been devised (referred, for example, to Jpn. Pat. Appln. Laid-Open Publication Nos. 8-261763 and 8-327364).

The vibrator of the vibration gyro sensor needs to be a regular square pole having a square cross-section in order to detect an angular rate with stable detection accuracy. However, it is physically very difficult to obtain the vibrator as a perfectly regular square pole in the case where the vibrator is manufactured by machine work or in the case where the vibrator is manufactured by processing a single-crystal silicon substrate with a thin-film formation process, so that the manufactured vibrator may have an asymmetrical cross-section.

When a drive signal is applied to such an asymmetrical shaped vibrator to cause self-excited vibration, the vibration direction does not follow the center line of the vibrator, but is inclined relative to the center line of the vibrator. When the vibration direction is inclined as described above, the value of the detection signal to be detected for the angular rate detection becomes inaccurate, leading to an inaccurate angular rate.

SUMMARY OF THE INVENTION

The present invention has been made to solve the above problem, and an object thereof is to provide a method of manufacturing a vibration gyro sensor element capable of adequately adjusting the vibration direction of a vibrator of the small-sized vibration gyro sensor element manufactured by using a thin film formation process in a state where the vibrator is allowed to vibrate self-excitedly without application of an angular rate, a vibration gyro sensor element, and a method of adjusting vibration direction.

To achieve the above object, according to a first aspect of the present invention, there is provided a method of manufacturing a vibration gyro sensor element that includes a cantilever vibrator having a lower electrode, a piezoelectric thin film, and an upper electrode, and detects an angular rate using piezoelectric effect of the piezoelectric thin film. The method comprises the steps of: forming a first protective film pattern including a first opening portion constituted by the lines parallel to and perpendicular to a {110} surface on a first main surface of a single-crystal silicon substrate, the first main surface and a second main surface of the single-crystal silicon substrate opposite to the first main surface having orientations {100}, and applying crystal anisotropic etching to the first opening portion until the thickness of the etched portion becomes the thickness of the vibrator; sequentially forming the lower electrode, piezoelectric thin film, and upper electrode in a stacked manner on the area to become the vibrator, the area being included in the second main surface opposite to the first main surface that has been subjected to the crystal anisotropic etching until the thickness of the etched portion becomes the thickness of the vibrator; forming a second protective film pattern including a second opening portion having a space that makes the vibrator to be a cantilever shape on the second main surface where the lower electrode, piezoelectric thin film, upper electrode have been formed, the second opening portion being constituted by the lines parallel to and perpendicular to the {110} surface, and forming the vibrator by applying reactive ion etching (RIE) to the second opening portion; forming, as the upper electrode, a drive electrode to which a voltage for allowing the vibrator to vibrate is applied and first and second detection electrodes extending in the longitudinal direction of the vibrator in parallel to each other such that the drive electrode is interposed between the first and second detection electrodes and does not contact with the detection electrodes; and irradiating a laser light to a desired portion of the vibrator to apply grinding operation based on detection signals detected in the first and second detection electrodes in the case where there is a difference between the detection signals detected in the first and second detection electrodes, the detection signals being obtained when a voltage is applied between the lower electrode and drive electrode to allow the vibrator to vibrate at a vertical resonance frequency.

To achieve the above object, according to a second aspect of the present invention, there is provided a vibration gyro sensor element that includes a cantilever vibrator having a lower electrode, a piezoelectric thin film, and an upper electrode, and detects an angular rate using piezoelectric effect of the piezoelectric thin film. The element comprises the vibrator according to a manufacturing method including the steps of: forming a first protective film pattern including a first opening portion constituted by the lines parallel to and perpendicular to a {110} surface on a first main surface of a single-crystal silicon substrate, the first main surface and a second main surface of the single-crystal silicon substrate opposite to the first main surface having orientations {100}, and applying crystal anisotropic etching to the first opening portion until the thickness of the etched portion becomes the thickness of the vibrator; sequentially forming the lower electrode, piezoelectric thin film, and upper electrode in a stacked manner on the area to become the vibrator, the area being included in the second main surface opposite to the first main surface that has been subjected to the crystal anisotropic etching until the thickness of the etched portion becomes the thickness of the vibrator; and forming a second protective film pattern including a second opening portion having a space that makes the vibrator to be a cantilever shape on the second main surface where the lower electrode, piezoelectric thin film, upper electrode have been formed, the second opening portion being constituted by the lines parallel to and perpendicular to the {110} surface, and forming the vibrator by applying reactive ion etching (RIE) to the second opening portion. The vibrator includes, as the upper electrode, a drive electrode to which a voltage for allowing the vibrator to vibrate is applied and first and second detection electrodes extending in the longitudinal direction of the vibrator in parallel to each other such that the drive electrode is interposed between the first and second detection electrodes and does not contact with the detection electrodes, and the vibrator is grinded by irradiating a laser light to a desired portion of the vibrator based on detection signals detected in the first and second detection electrodes in the case where there is a difference between the detection signals detected in the first and second detection electrodes, the detection signals being obtained when a voltage is applied between the lower electrode and drive electrode to allow the vibrator to vibrate at a vertical resonance frequency.

To achieve the above object, according to a third aspect of the present invention, there is provided a method of adjusting vibration direction of the vibrator, the vibrator being a cantilever vibrator having a lower electrode, a piezoelectric thin film, and an upper electrode formed on a single-crystal silicon substrate by a thin film formation process and included in a vibration gyro sensor element that detects an angular rate using piezoelectric effect of the piezoelectric thin film. The method comprises the steps of: forming, as the upper electrode, a drive electrode to which a voltage for allowing the vibrator to vibrate is applied and first and second detection electrodes extending in the longitudinal direction of the vibrator in parallel to each other such that the drive electrode is interposed between the first and second detection electrodes and does not contact with the detection electrodes; and irradiating a laser light to a desired portion of the vibrator to apply grinding operation based on detection signals detected in the first and second detection electrodes in the case where there is a difference between the detection signals detected in the first and second detection electrodes, the detection signals being obtained when a voltage is applied between the lower electrode and drive electrode to allow the vibrator to vibrate at a vertical resonance frequency.

In the present invention, a drive electrode to which a voltage for allowing the vibrator to vibrate is applied and first and second detection electrodes extending in the longitudinal direction of the vibrator in parallel to each other are formed as the upper electrode such that the drive electrode is interposed between the first and second detection electrodes and does not contact with the detection electrodes. In the case where there is a difference between the detection signals detected in the first and second detection electrodes when a voltage is applied between the lower electrode and drive electrode to allow the vibrator to vibrate at a vertical resonance frequency, a laser light is irradiated to a desired portion of the vibrator to apply grinding operation based on detection signals detected in the first and second detection electrodes, thereby adjusting the shape of the vibrator.

Thus, it is possible to adequately adjust the shape of the vibrator grinded by the laser light irradiation without using an uncertain method that visually observes symmetric property of the vibrator and adjusts the inclination of the vibration direction caused due to malformation of the vibrator before grinding operation. Therefore, the vibration gyro sensor element including the above vibrator can detect an angular rate with satisfactory detection characteristics.

DETAILED DESCRIPTION OF THE PREFERRED EMBODIMENTS

A preferred embodiment of a manufacturing method of a vibration gyro sensor element, a vibration gyro sensor elements, and a method of adjusting vibration direction according to the present invention will be described below in detail with reference to the accompanying drawings.

Figure 1:
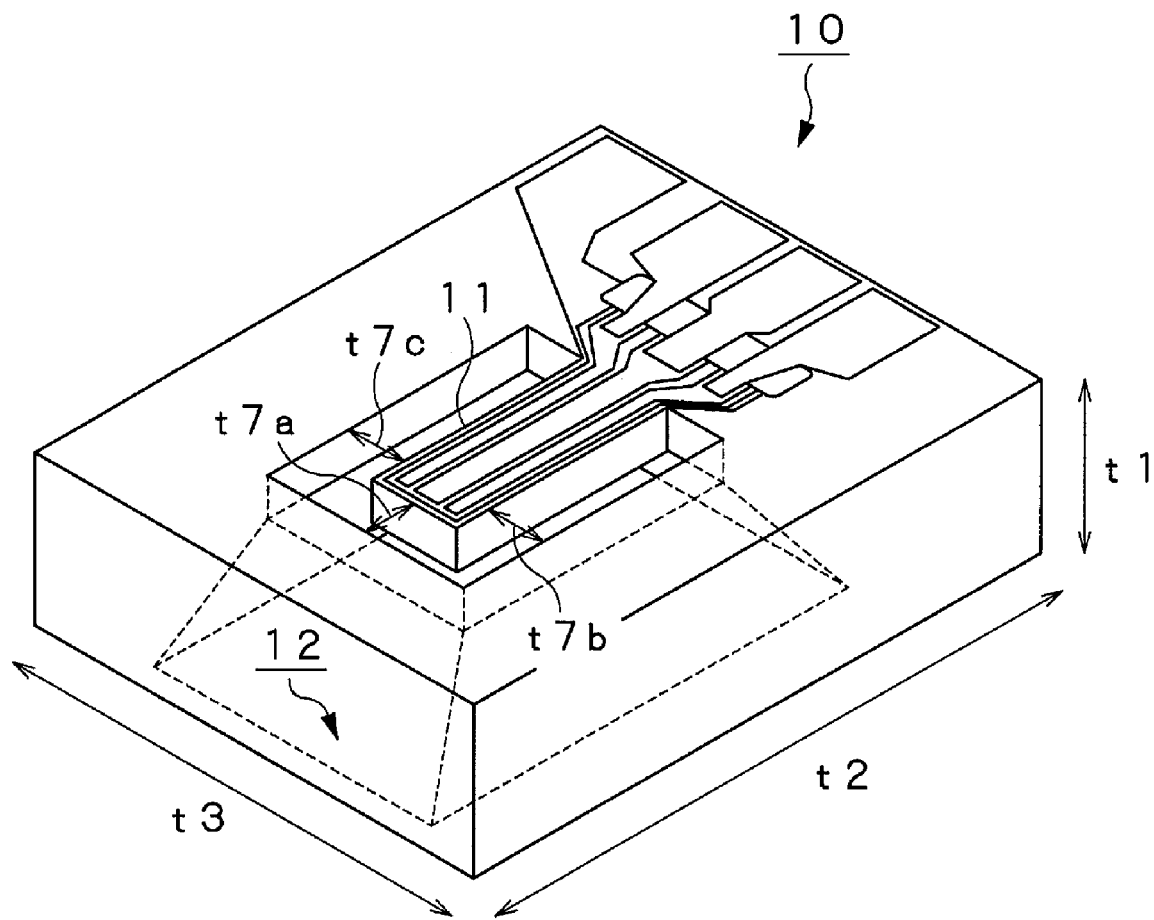
FIG. 1 is a perspective view for explaining a vibration gyro sensor element shown as a preferred embodiment of the present invention.
Figure 2:
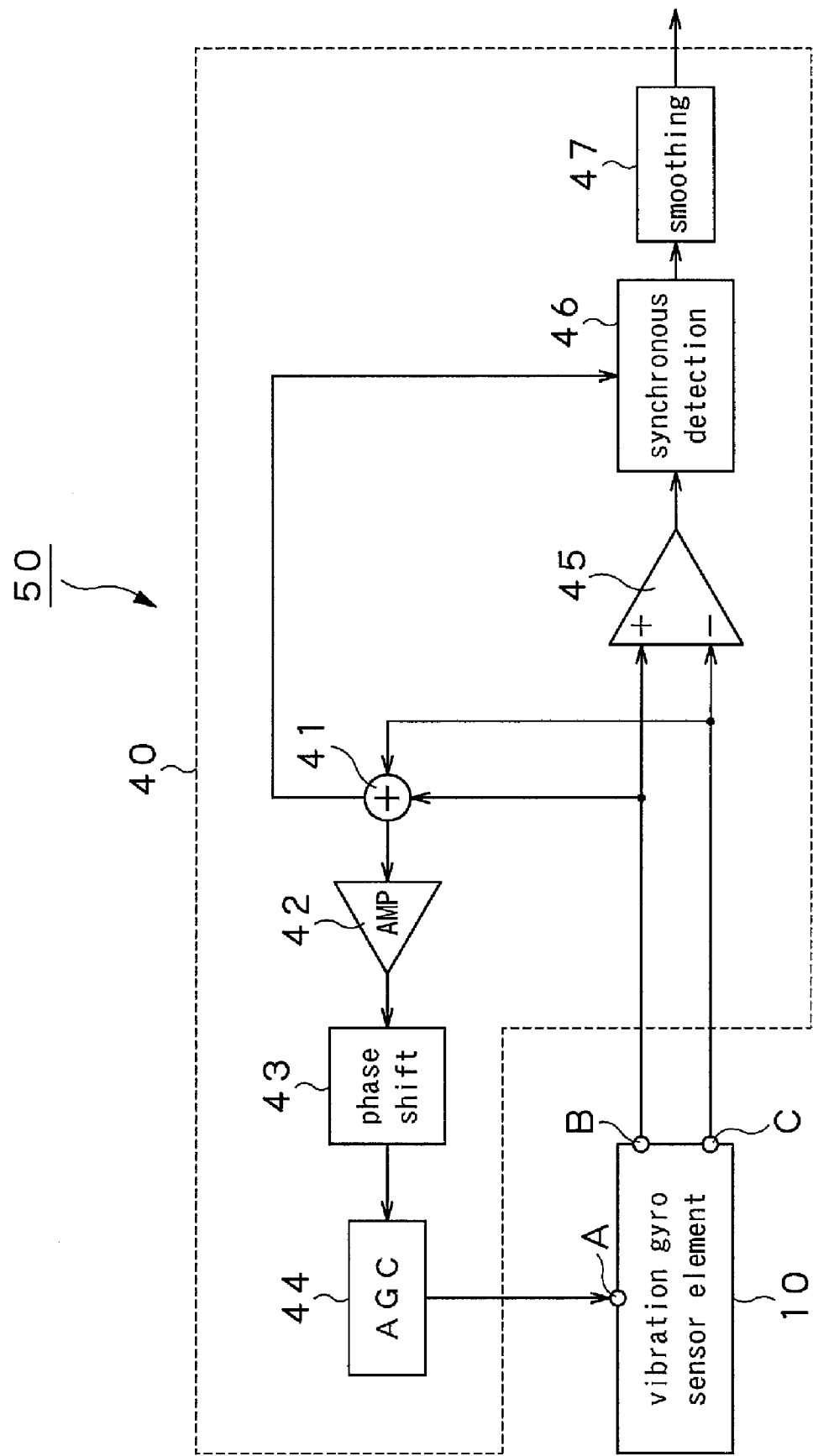
FIG. 2 is a view for explaining a configuration of an angular rate sensor including the vibration gyro sensor element.

FIG. 1 is a perspective view showing a vibration gyro sensor element 10 included in an angular rate sensor 50 to which the present invention is applied, and FIG. 2 is a view showing an example of a circuit configuration of the angular rate sensor 50. A part of the vibration gyro sensor element 10 of FIG. 1 is shown in a transparent manner for illustrative purposes.

As shown in FIG. 1, the vibration gyro sensor element 10 has so-called a cantilever vibrator 11. The vibrator 11 is formed as a beam having fixed one end by providing a surrounding space 12 around the vibrator 11 in an element having a thickness of t1, length of t2, and width of t3 obtained by cutting a silicon single-crystal substrate. Around the vibrator 11, space widths of t7b and t7c in the direction perpendicular to the longitudinal direction of the vibrator 11, and a space width of t7a in the longitudinal direction thereof are ensured. Note that t7b and t7c are the same length.

The vibrator 11 is formed as a square pole having a square cross-section obtained when the vibrator 11 is cut along a plane perpendicular to the longitudinal direction thereof.

Figure 3:
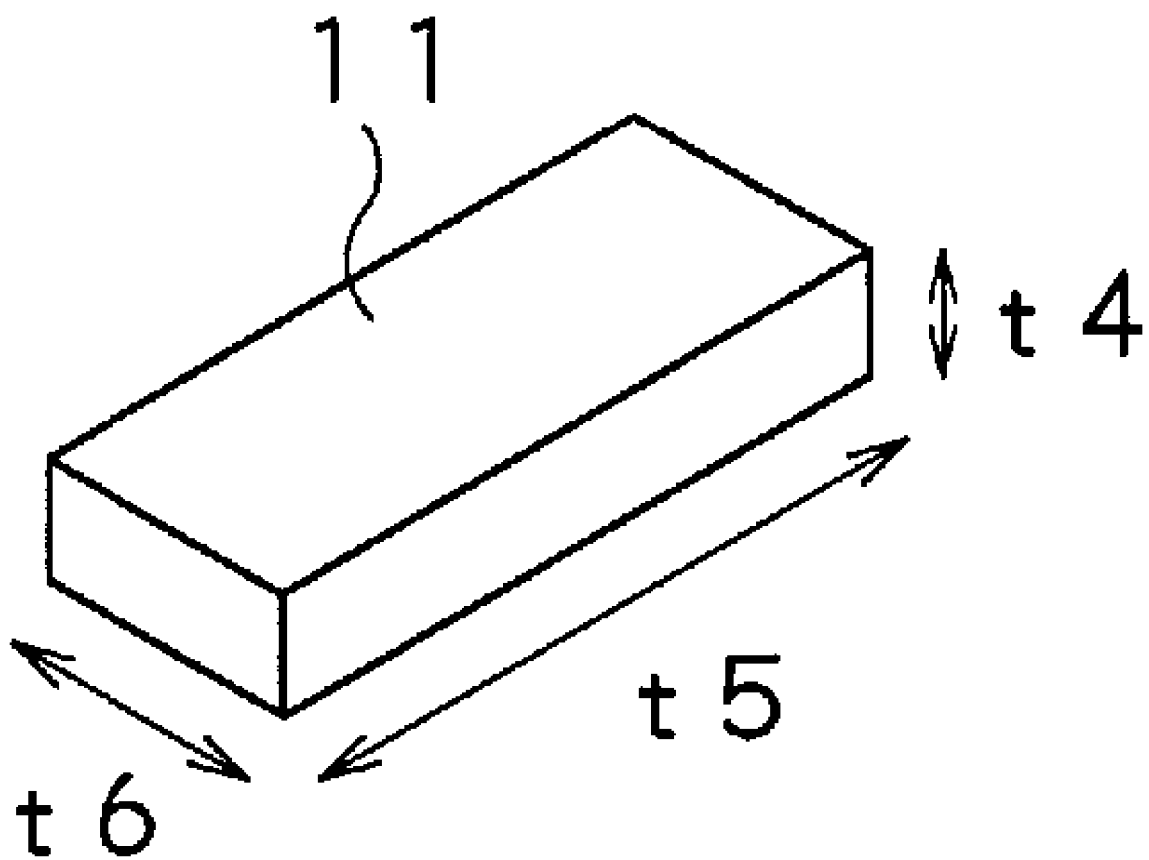
FIG. 3 is a perspective view for explaining a vibrator included in the vibration gyro sensor element.

The vibration gyro sensor element 10 can have, for example, the size of t1=300 μm, t2=3 mm, and t3=1 mm, assuming that the thickness, length, width of the element are t1, t2, and t3, respectively, as described above. The size of the vibrator 11 at this time can be set to, for example, t4=100 μm, t5=2.5 mm, and t6=100 μm, assuming that the thickness, length, width of the vibrator are t4, t5, and t6, respectively, as shown in FIG. 3.

Figure 4:
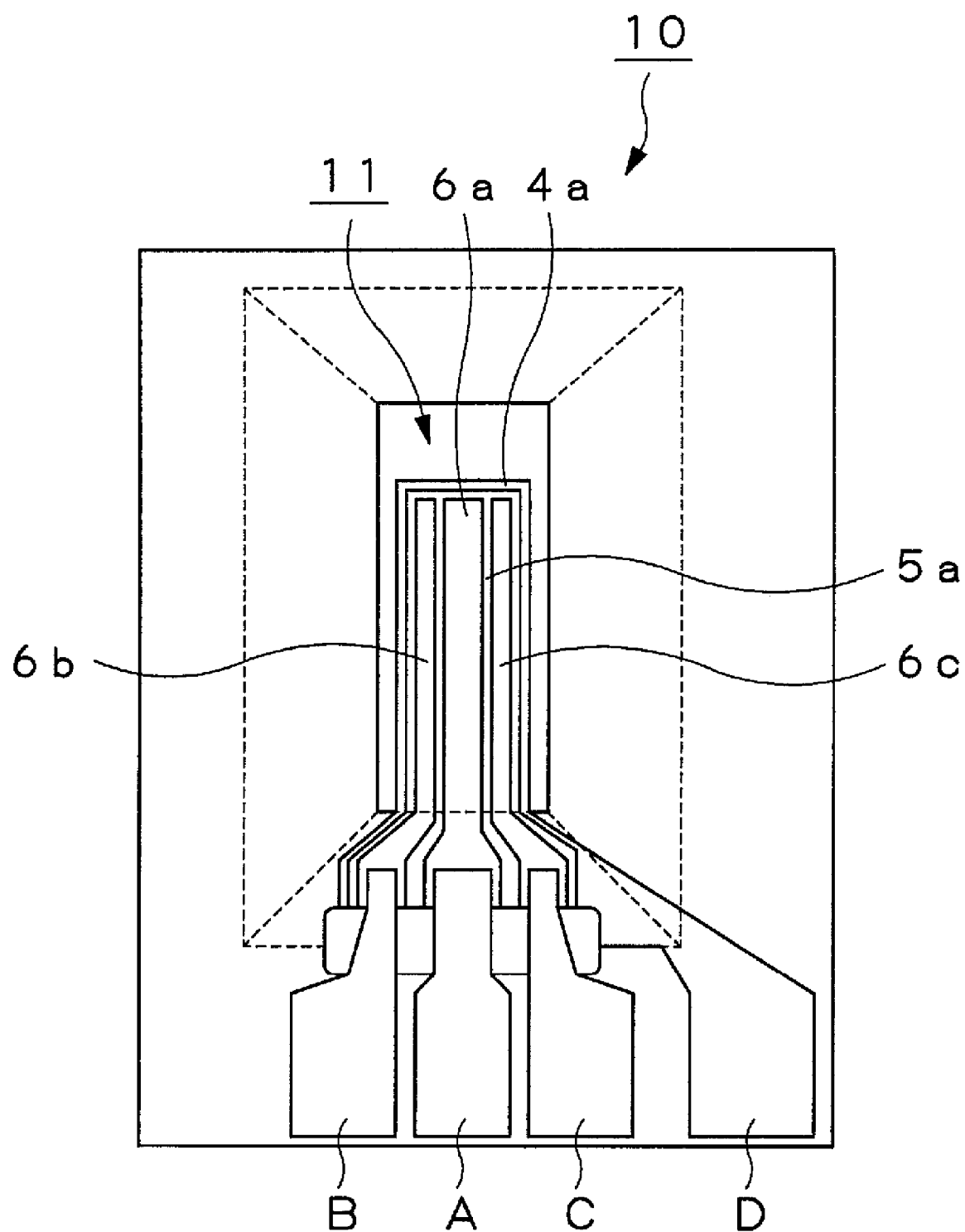
FIG. 4 is a plan view for explaining the vibration gyro sensor element.

FIG. 4 is a plan view of the vibration gyro sensor element 10. As shown in FIG. 4, a reference electrode 4a and a piezoelectric body 5a are sequentially stacked on the vibrator 11. Further, on the piezoelectric body 5a, a pair of detection electrodes 6b and 6c and a drive electrode 6a interposed between the pair of detection electrodes 6b and 6c are formed in such a manner that they extend in parallel to each other in the longitudinal direction of the vibrator 11 and that they are not in contact with each other. Wire connection terminals A, B, C, and D are provided for the drive electrode 6a, detection electrodes 6b and 6c, and reference electrode 4a, respectively.

The piezoelectric body 5a is a thin film made of, for example, piezoelectric ceramics such as lead zirconate titanate (PZT), or piezoelectric single crystal such as quartz or LaTaO$_3$.

The vibration gyro sensor element 10 having the above configuration operates by connecting to an IC circuit 40 shown in FIG. 2 and functions as the angular rate sensor 50 to detect Coriolis force generated in accordance with the angular rate.

The IC circuit 40 includes an adder circuit 41, an amplifier circuit 42, a phase shift circuit 43, an AGC (Automatic Gain Control) 44, a differential amplifier circuit 45, a synchronous detection circuit 46, and a smoothing circuit 47.

The pair of detection electrodes 6b and 6c of the vibration gyro sensor element 10 are connected to the adder circuit 41 and differential amplifier circuit 45, respectively via the wire connection terminals B and C. The drive electrode 6a of the vibration gyro sensor element 10 is connected to the output terminal of the AGC 44 via the wire connection terminal A.

In the angular rate sensor 50, the adder circuit 41, amplifier circuit 42, phase shift circuit 43, AGC 44 and vibration gyro sensor element 10 constitute so-called a phase shift oscillator, which applies voltage between the reference electrode 4a and drive electrode 6a to allow the vibrator to vibrate self-excitedly. The vibration direction of the vibrator 11 corresponds to the thickness direction of the vibrator 11.

Further, in the angular rate sensor 50, the output terminals of the adder circuit 41 and differential amplifier circuit 45 whose input terminals are connected to the pair of detection electrodes 6b and 6c via the wire connection terminals B and C are connected to the synchronous detection circuit 46, which is then connected to the smoothing circuit 47. The combination of the above components and the piezoelectric body 5a functions as a detection section that detects the angular rate of the vibrator 11.

More specifically, in the angular rate sensor 50 shown in FIG. 2, when an angular rate is applied to the vibrator 11 in the longitudinal direction thereof while the vibrator 11 of the vibration gyro sensor element 10 is allowed to vibrate self-excitedly by the above phase shift oscillator, Coriolis force is generated in a direction perpendicular to the vibration direction of the vibrator 11. The generated Coriolis force is detected by the piezoelectric body 5a, and the detection result output from the detection electrodes 6b and 6c as signals with reversed polarity to each other is input to the differential amplifier circuit 45. The output amplified by the differential amplifier circuit 45 is input to the synchronous detection circuit 46, where the synchronous detection is performed. In order for the synchronous detection to be performed, the output from the adder circuit 41 is supplied as a synchronous signal to the synchronous detection circuit 46. The output from the synchronous detection circuit 46 is finally output via the smoothing circuit 47 as an angular rate signal, which is a direct current signal obtained by detecting the Coriolis force generated in the vibrator 11.

As described above, the angular rate sensor 50 uses the piezoelectric body 5a to allow the vibrator 11 to vibrate and to detect the Coriolis force generated in the vibrator 11, and the angular rate can be detected based on the Coriolis force detected by the piezoelectric body 5a.

EXAMPLE

A manufacturing method of the above vibration gyro sensor element 10 will next be described as an example.

As described above, the vibration gyro sensor element 10 shown in FIG. 1 is formed by processing a single-crystal silicon substrate.

Figure 5:
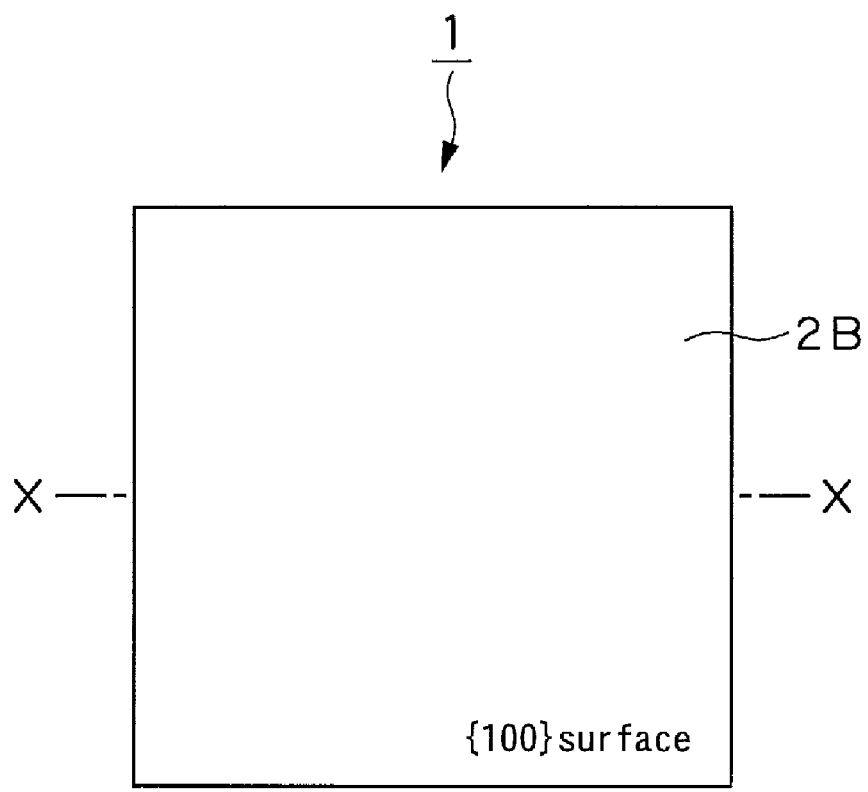
FIG. 5 is a plan view for explaining a single-crystal silicon substrate used when the vibration gyro sensor element is manufactured.
Figure 6:
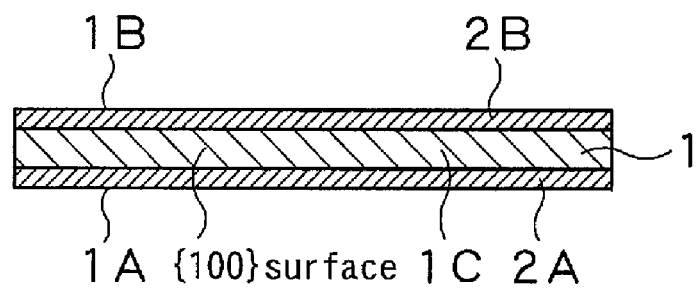
FIG. 6 is a cross-sectional view when the single-crystal silicon substrate shown in FIG. 5 is cut along the line XX.

FIG. 5 is a plan view of the single-crystal silicon substrate 1 used when the vibration gyro sensor element 10 is manufactured. FIG. 6 is a cross-sectional view when the single-crystal silicon substrate 1 shown in FIG. 5 is cut along the line XX. One main surface 1B and the other main surface 1A of the single-crystal silicon substrate 1 are subjected to thermal oxidation so as to form $SiO_2$ films respectively on both the main surfaces. The $SiO_2$ film serves as a protective film in step of crystal anisotropic etching to be described later.

The single-crystal silicon substrate 1 used for the vibration gyro sensor element 10 is cut out such that the one main surface 1B of the single-crystal silicon substrate 1 has a surface orientation {100} as shown in FIG. 5, and the side surface 1C has a surface orientation {110} as shown in FIG. 6. Since the other main surface 1A is in parallel to the one main surface 1B, the surface orientation of the other main surface 1A is also {100}.

It is assumed that "{ }" is a symbol for collectively representing equivalent surface orientations among which the directions are different from each other, and, for example, {100} collectively represents (100), (010), (001), and the like.

The size of the single-crystal silicon substrate 1 to be cut out with the crystal surface orientations defined as described above is arbitrarily set depending on a machine provided on a manufacturing line. For example, the single-crystal silicon substrate 1 has a size of 3 centimeters by 3 centimeters in the present example.

While the thickness of the single-crystal silicon substrate 1 is determined in consideration of workability or the price of the substrate, it is sufficient for the single-crystal silicon substrate 1 to have at least a thickness greater than the thickness of the vibrator 11 formed in the vibration gyro sensor element 10. For example, in the present example, since the thickness t4 of the vibrator 11 is set to 100 μm as shown in FIG. 3, the thickness of the single-crystal silicon substrate 1 is set to 300 μm that is three times greater than the thickness of the vibrator 11.

As shown in FIG. 6, the one main surface 1B and the other main surface 1A of the single-crystal silicon substrate 1 are subjected to thermal oxidation so as to form thermally-oxidized films 2A and 2B, which are $SiO_2$ films, respectively on both the main surfaces. The thermally-oxidized films 2A and 2B serve as a protective film in step of crystal anisotropic etching to be described later. The thicknesses of the thermally-oxidized films 2A and 2B can be arbitrarily determined, and are set to 0.1 μm in the present example. Further, while a single-crystal silicon substrate 1 of N-conductive type is employed in the present example, the conductive type can be arbitrarily determined.

Hereinafter, in the single-crystal silicon substrate 1, the other main surface 1A on which the thermally-oxidized film 2A has been formed is assumed to be "front surface", and the one main surface 1B on which the thermally-oxidized film 2B has been formed is assumed to be "back surface".

The above single-crystal silicon substrate 1 is used to manufacture the vibration gyro sensor element 10, in practice. Firstly, on the back surface of the single-crystal silicon substrate 1, the thermally-oxidized film 2B that has been formed in the portion to be subjected to crystal anisotropic etching is removed by photoetching.

The photoetching to be performed is roughly divided into two steps: a step of forming a resist film pattern having openings corresponding to the portions to be removed on the thermally-oxidized film 2B (photolithography) and a step of removing the thermally-oxidized film 2B using the pattern (etching).

Figure 7:
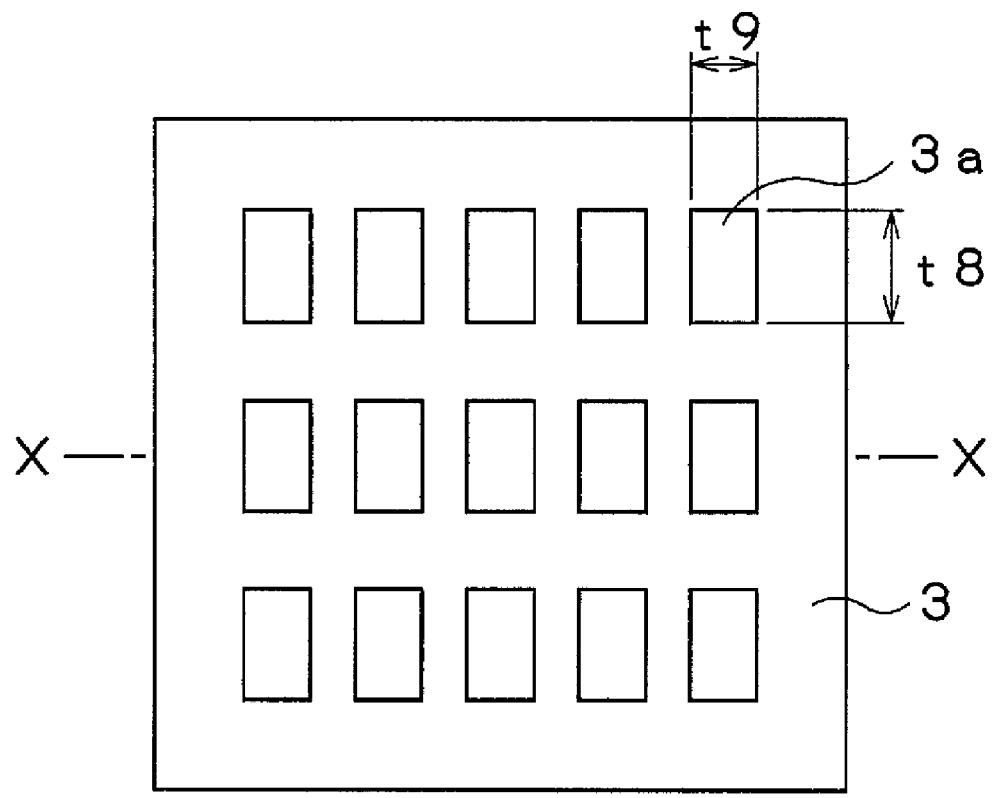
FIG. 7 is a plan view showing a state where a resist film pattern has been formed on the single-crystal silicon substrate.
Figure 8:
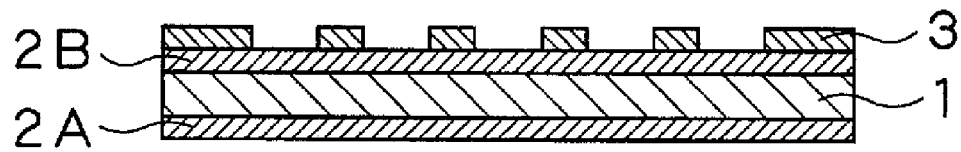
FIG. 8 is a cross-sectional view when the single-crystal silicon substrate shown in FIG. 7 is cut along the line XX.

FIG. 7 is a plan view showing a state where a resist film pattern 3 has been formed on the thermally-oxidized film 2B of the single-crystal silicon substrate 1, and FIG. 8 is a cross-sectional view when the single-crystal silicon substrate 1 shown in FIG. 7 is cut along the line XX.

As shown in FIG. 7, the resist film pattern 3 formed on the thermally-oxidized film 2B has opening portions 3a arranged regularly at predetermined intervals. Each of the opening portions 3a has a rectangular shape having a size of t8 by t9, t8 being the length in a direction perpendicular to the {110} surface, and t9 being the length in parallel to the {110} surface. In the present example, 3 by 5 opening portions 3a are formed in the pattern. Each of the opening portions 3a functions as a vibration gyro sensor element 10.

The resist film pattern 3 is formed in a manner entirely similar to photolithography used in semiconductor manufacturing process. That is, after microwave has been used to perform prebaking to heat the thermally-oxidized film 2B in order to remove moisture, a photo resist film made of photosensitive resin is coated onto the surface of the thermally-oxidized film 2B. Thereafter, a mask having the above pattern for forming the opening portions 3a is exposed onto the photo resist film, followed by development.

The lengths of the t8 and t9 that define each of the opening portions 3a are determined by the shape of the vibrator 11 formed in the vibration gyro sensor element 10, thickness t1 of the single-crystal silicon substrate 1, and space widths t7a, t7b, and t7c around the vibrator shown in FIG. 1. Concrete numerical values of t8 and t9 will be described later in detail.

In this manner, the resist film pattern 3 has been formed on the thermally-oxidized film 2B of the single-crystal silicon substrate 1 as shown in FIG. 8.

Figure 9:
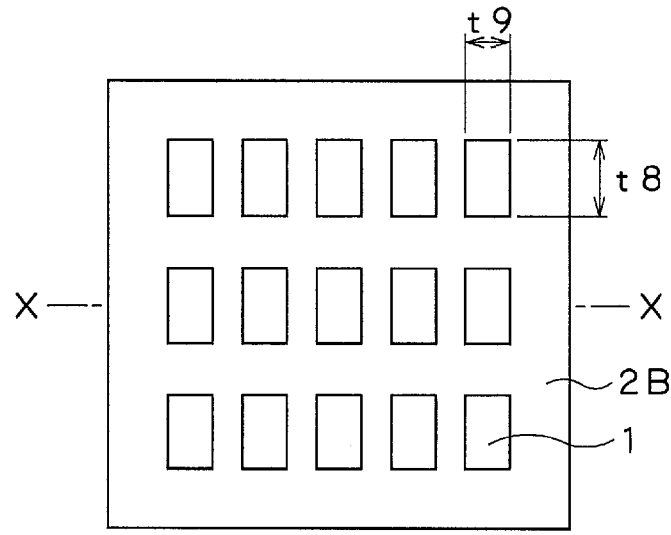
FIG. 9 is a plan view showing a state where a thermally-oxidized film has been removed from the single-crystal silicon substrate.
Figure 10:
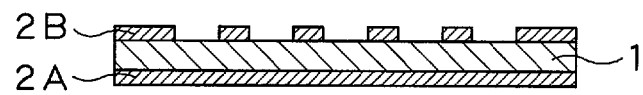
FIG. 10 is a cross-sectional view when the single-crystal silicon substrate shown in FIG. 9 is cut along the line XX.

Subsequently, the thermally-oxidized film 2B corresponding to the opening portions 3a formed by the resist film pattern 3 is removed by etching. FIG. 9 is a plan view showing a state where the thermally-oxidized film 2B corresponding to the opening portions 3a formed by the resist film pattern 3 has been removed. FIG. 10 is a cross-sectional view when the single-crystal silicon substrate 1 shown in FIG. 9 is cut along the line XX.

While the etching method used to remove the thermally-oxidized film 2B may be physical etching, such as ion etching, or wet etching, it is preferable to use wet etching that allows only the thermally-oxidized film 2B to be removed when the smoothness of the interface of the single-crystal silicon substrate 1 is taken into consideration.

In the present example, ammonium fluoride is used as chemicals in the wet etching. However, when the wet-etching is performed for a long time, etching proceeds from the side surface of the opening portion, that is, so-called side etching proceeds. Therefore, it is necessary to exactly control the etching time so that the etching is terminated at the time point when only the thermally-oxidized film 2B corresponding to the opening portions 3a has been removed.

In this manner, the thermally oxidized film 2B corresponding to the opening portions 3a of the resist film pattern 3 has been removed as shown in FIG. 10.

When the thermally oxidized film 2B has been removed by the above-mentioned etching, opening portions 2Ba each having a size of t8 by t9, which is the same as the size of each of the opening portions 3a of the resist film pattern 3, exposes the {100} surface of the single-crystal silicon substrate 1. The single-crystal silicon substrate 1 in this state is then subjected to the wet etching to reduce the thickness thereof to t4, which corresponds to the thickness of the vibrator 11.

Figure 11:
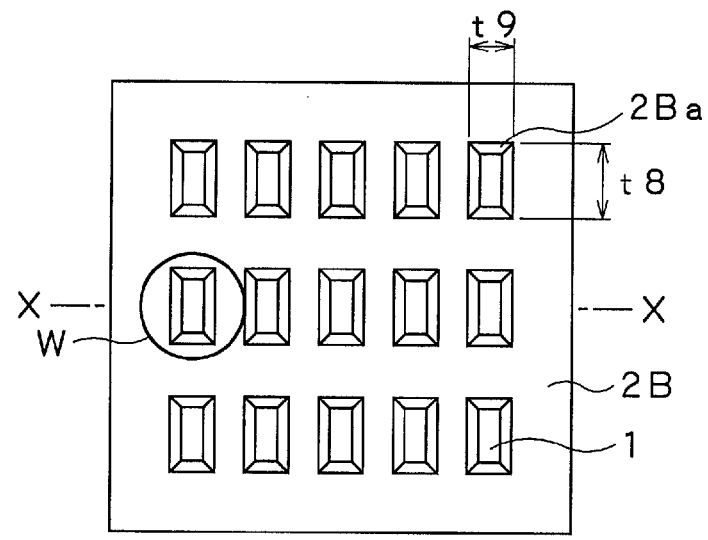
FIG. 11 is a plan view showing a state where the single-crystal silicon substrate has been subjected to crystal anisotropic etching.
Figure 12:
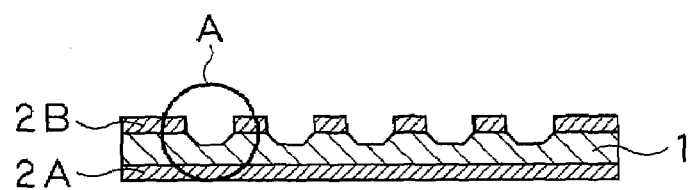
FIG. 12 is a cross-sectional view when the single-crystal silicon substrate shown in FIG. 11 is cut along the line XX.
Figure 13:
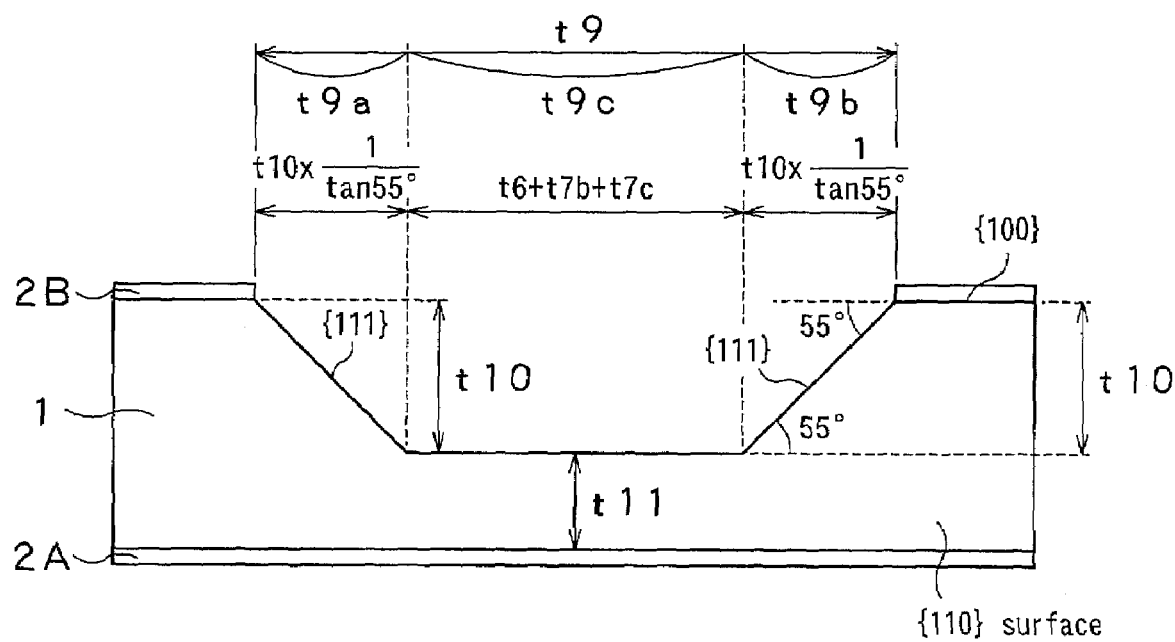
FIG. 13 is a cross-sectional view showing the area A of FIG. 12 in an enlarged manner.

FIG. 11 is a plan view showing a state where the thermally-oxidized film 2B corresponding to the opening portions 3a has been removed and only the opening portions 2Ba, each having a size of t8 by t9, through which the {100} surface of the single-crystal silicon substrate 1 is exposed has been etched, FIG. 12 is a cross-sectional view when the single-crystal silicon substrate 1 shown in FIG. 11 is cut along the line XX, and FIG. 13 is a cross-sectional view showing the area A of FIG. 12 in an enlarged manner.

The wet etching applied to the single-crystal silicon substrate 1 is crystal anisotropic etching taking advantage of the nature that etching rate depends upon crystal orientation. When the crystal anisotropic etching is applied to the opening portions 2Ba obtained by removing the thermally-oxidized film 2B and through which the {100} surface is exposed, {111} surface that is a surface orientation with an angle of about 55° relative to the {100} surface appears as shown in FIG. 13. When the etching has been applied with the thickness corresponding to t4, which is the thickness of the vibrator 11, assured, so called a diaphragm shape has been obtained.

In general, the single-crystal silicon has a crystal structure exhibiting etching rate dependency on the crystal orientation. That is, the {111} surface is more hardly etched than the {100} surface. To be specific, the etching rate of the {100} surface of the single-crystal silicon is 200 times higher than that of the {111} surface.

Etching solutions that can be used when the crystal anisotropic etching is applied to the single-crystal silicon include TMAH (tetramethyl ammonium hydroxide), KOH (potassium hydroxide), EDP (ethylenediamine-pyrocathecol-water), and hydrazine.

In the present example, TMAH (tetramethyl ammonium hydroxide) 20 wt % solution that allows the etching rate selectivity between the thermally-oxidized films (2A and 2B) and the single-crystal silicon to be further increased was used. At the time of etching, the etching solution was stirred to maintain the temperature of the solution at 80° C. In this state, the etching was performed for six hours until the depth t10 of the diaphragm had become 200 µm, that is, the thickness t11 of the single-crystal silicon substrate 1 to be remained after etching had become 100 µm, which corresponds to the thickness t4 of the vibrator 11.

A concrete description will be given of the numerical values of t8 and t9 that define the size of the opening portion 3a, which has been formed by means of the resist film pattern 3 of FIG. 7 for the subsequent crystal anisotropic etching.

The width t9 of the opening portion 3a, that is, the width of the diaphragm after etching is represented by the equation: $t9=t9a+t9b+t9c$, as shown in FIG. 13.

$t9c$ can be represented by the following equation, using the width t6 of the vibrator 11 shown in FIG. 3 and space widths t7b and t7c of the surrounding space 12 of FIG. 1 formed around the vibrator 11: $t9c=t6+t7b+t7c$.

Further, the {111} surface that appears after the crystal anisotropic etching and {100} surface which is the back surface of the single-crystal silicon substrate 1 form an angle of 55° as shown in FIG. 13. Therefore, t9a and t9b, which are the same value, can be represented by the following equation, using the depth t10 of the diaphragm: $t9a=t9b=t10\times1/\tan 55°$.

Accordingly, the width t9 of the opening portion 3a can be represented by the equation: $t9=\{t10\times1/\tan 55°\}\times2+(t6+t7b+t7c)$. Assuming that t6=100 µm, t7b=t7c=200 µm, and t10=200 µm, 780 µm is obtained as t9.

After the above crystal anisotropic etching has been performed, {111} surface that is a surface orientation with an angle of about 55° relative to the {100} surface appears also in t8 direction as well as in t9 direction. Accordingly, the length t8 of the opening portion, that is, the length of the diaphragm after etching is represented by the following equation, using the length t5 of the vibrator 11 of FIG. 3 and space width t7a of the surrounding space 12 of FIG. 1 formed around the vibrator 11: $t8=\{t10\times1/\tan 55°\}\times2+(t5+t7a)$. Assuming that t5=2.5 mm, t7a=200 µm, and t10=200 µm, 2980 µm is obtained as t8.

Although the entire configuration of the single-crystal silicon substrate 1 has been described in the foregoing, the following description will be given of only one single-crystal silicon substrate 1 on which the diaphragm has been formed, which corresponds to an area W shown in FIG. 11 for simplicity of explanation. Further, since the following description relates to a processing step for the thermally-oxidized film 2A side, plan views in which the thermally-oxidized film 2A, which is the front surface, is set as the upper surface, and cross-sectional views each obtained when the plan view is cut along a predetermined position are used.

Figure 14:
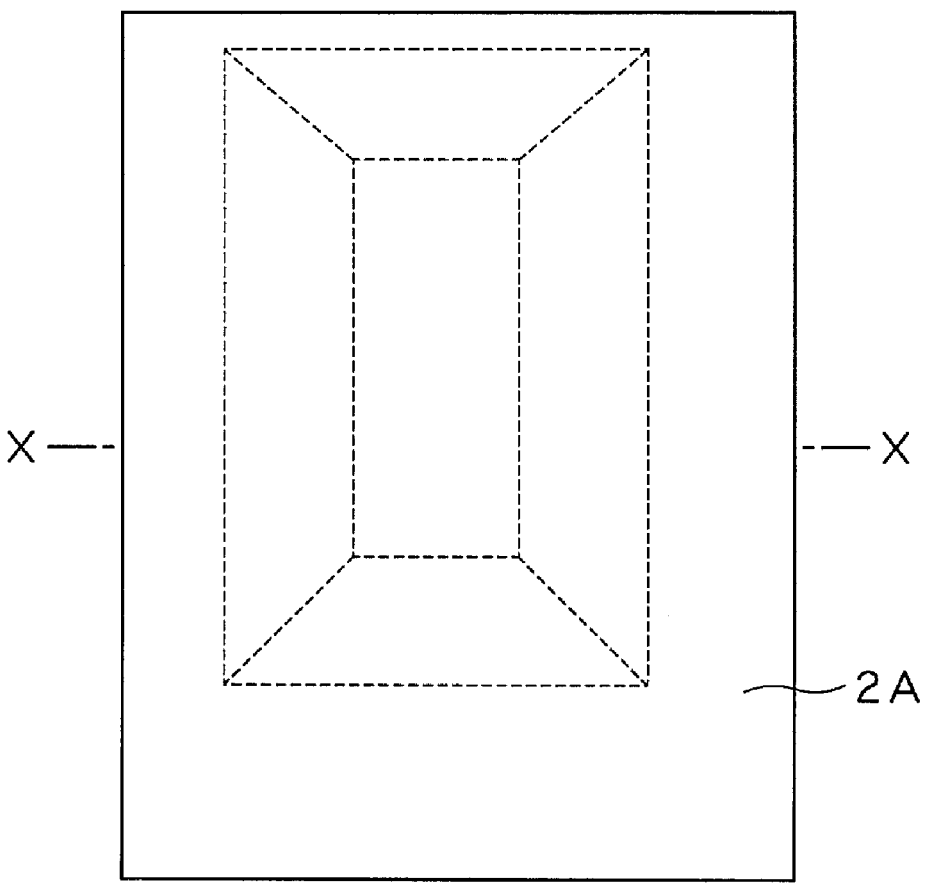
FIG. 14 is a plan view showing a state of the front surface side of the single-crystal silicon substrate.
Figure 15:
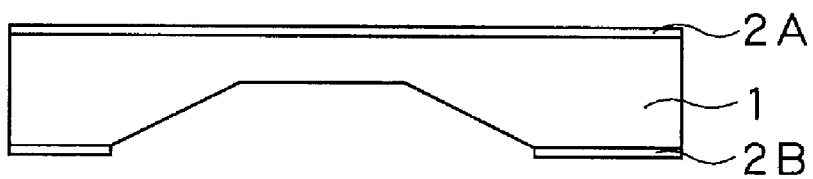
FIG. 15 is a cross-sectional view when the single-crystal silicon substrate shown in FIG. 14 is cut along the line XX.

To be more precise, when the thermally-oxidized film 2A of the single-crystal silicon substrate 1 on which the diaphragm of the area W shown in FIG. 11 has been formed is set as the upper surface, the plan view as shown in FIG. 14 and corresponding cross-sectional view as shown in FIG. 15 taken along the line XX are obtained.

Figure 16:
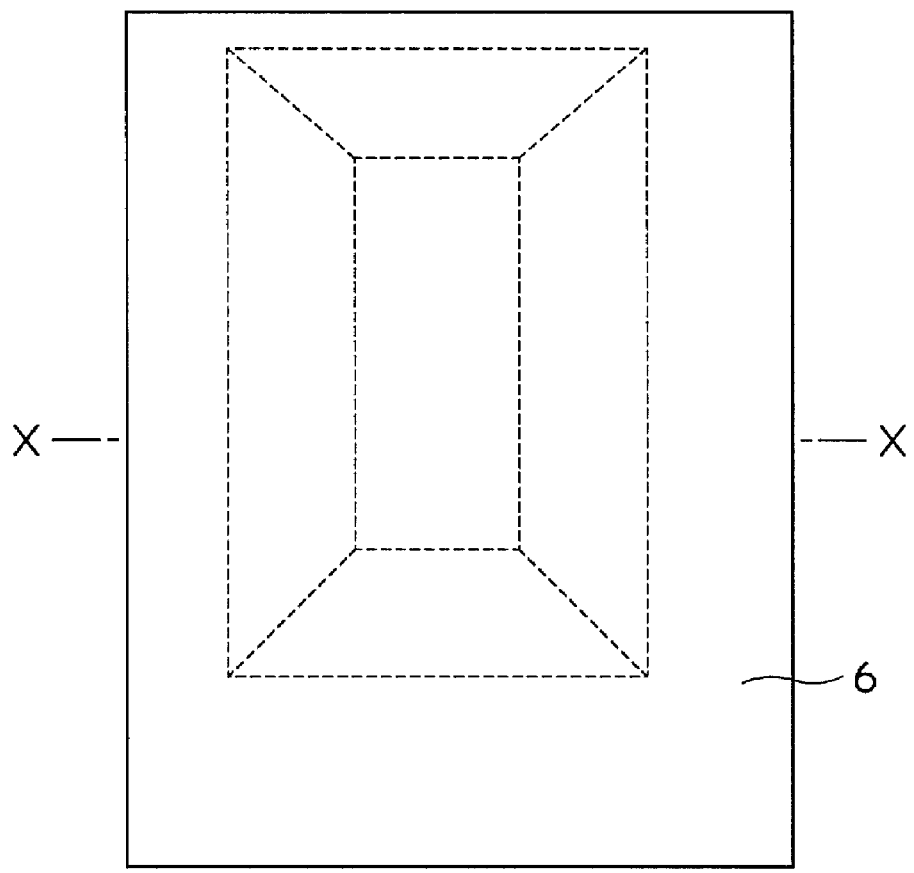
FIG. 16 is a plan view showing a state of the single-crystal silicon substrate on which a lower electrode film, a piezoelectric film, and an upper electrode film have been formed.
Figure 17:
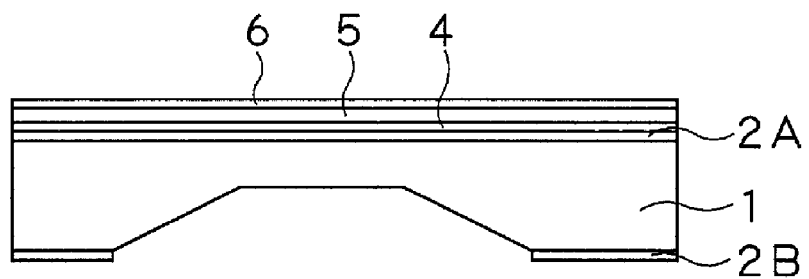
FIG. 17 is a cross-sectional view when the single-crystal silicon substrate shown in FIG. 16 is cut along the line XX.

Subsequently, a lower electrode film, a piezoelectric film, and an upper electrode film are deposited on the thermally-oxidized film 2A for formation of the reference electrode 4a, piezoelectric body 5a, drive electrode 6a, and detection electrodes 6b and 6c. FIG. 16 is a plan view showing a state where the lower electrode film 4, piezoelectric film 5, and upper electrode film 6 are deposited on the thermally-oxidized film 2A of the single-crystal silicon substrate 1, and FIG. 17 is a cross-sectional view taken along the line XX in FIG. 16.

In the present example, the lower electrode film 4, piezoelectric film 5, and upper electrode film 6 are deposited using a magnetron sputtering machine.

Firstly, the lower electrode film 4 is deposited on the thermally-oxidized film 2A. In the present example, titanium (Ti) was deposited to a film thickness of 50 nm on the thermally-oxidized film 2A under a magnetron sputtering condition of gas pressure: 0.5 Pa, RF power: 1 kw. Subsequently, platinum was deposited to a film thickness of 200 nm on the deposited titanium (Ti) under a magnetron sputtering condition of gas pressure: 0.5 Pa, RF power: 0.5 kw. That is, the deposited titanium and platinum having the above thicknesses constitute the lower electrode film 4.

After that, the piezoelectric film 5 is deposited on the lower electrode film 4. In the present example, with $Pb_{(1+x)}(Zr_{0.53}Ti_{0.47})O_{3-y}$ oxide used as a target, lead zirconate titanate (PZT) piezoelectric thin film was deposited to a film thickness of 1 μm on the platinum (Pt) deposited as the lower electrode film 4 under a magnetron sputtering condition of room temperature, gas pressure: 0.7 Pa, RF power: 0.5 kw. Subsequently, the single-crystal silicon substrate 1 on which lead zirconate titanate (PZT) film had been formed was put into an electric furnace and crystallization heat treatment was conducted under an oxygen atmosphere at 700° C. for 10 minutes to form the piezoelectric film 5.

Finally, the upper electrode film 6 is deposited on the piezoelectric film 5. In the present example, platinum (Pt) was deposited to a film thickness of 200 nm on the piezoelectric film 5 under a magnetron sputtering condition of gas pressure: 0.5 Pa, RF power: 0.5 kw.

Figure 18:
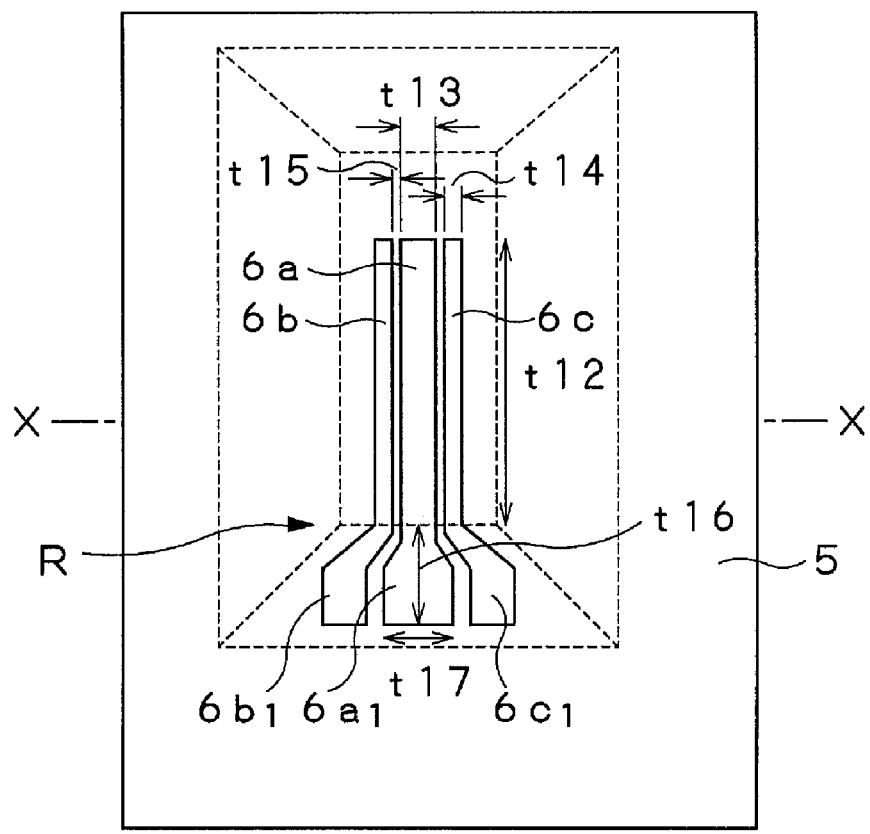
FIG. 18 is a plan view showing a state of the single-crystal silicon substrate on which a drive electrode and detection electrodes have been formed.
Figure 19:
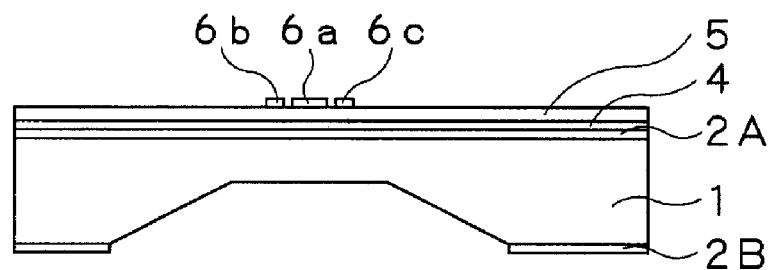
FIG. 19 is a cross-sectional view when the single-crystal silicon substrate shown in FIG. 18 is cut along the line XX.

Next, the obtained upper electrode film 6 is processed to form the drive electrode 6a and detection electrodes 6b and 6c. FIG. 18 is a plan view showing a state of the single-crystal silicon substrate 1 on which a drive electrode 6a and detection electrodes 6b and 6c have been formed, and FIG. 19 is a cross-sectional view when the single-crystal silicon substrate 1 shown in FIG. 18 is cut along the line xx.

The drive electrode 6a serves to apply voltage for driving the vibrator 11 as described above, and is formed to position at the center of the vibrator 11. The detection electrodes 6b and 6c serve to detect the Coriolis force generated in the vibrator 11 as described above and are formed on the vibrator 11 in such a manner to extend in parallel to the drive electrode 6a and not to contact with the drive electrode 6a.

As shown in FIG. 18, each of the drive electrode 6a and detection electrodes 6b and 6c has one edge portion aligned with a root line R which is a root of the vibrator 11, and terminal joint portions $6a_1$, $6b_1$, and $6c_1$ are formed at the one edge portions of the above electrodes, respectively.

In the present example, the width t13 of the drive electrode 6a is set to 50 μm, the width t14 of the detection electrodes 6b and 6c is set to 10 μm, the length t12 of the drive electrode 6a and detection electrodes 6b and 6c is set to 2 mm, and the interval t15 between the drive electrode 6a and each of the detection electrodes 6b and 6c is set to 5 μm. The sizes of the drive electrode 6a and detection electrodes 6b and 6c can be arbitrarily set as far as they are formed within the size of the vibrator 11. Further, in the present example, the length t16 and the width t17 of the terminal joint portions $6a_1$, $6b_1$, and $6c_1$ are set to 50 μm, and 50 μm, respectively.

In the present embodiment, after the resist film pattern had been formed on the upper electrode film 6 using a photolithography technique, unnecessary portions of the electrode film 6 were removed by ion etching, thereby forming the drive electrode 6a, detection electrodes 6b and 6c, and terminal joint portions $6a_1$, $6b_1$, and $6c_1$.

The present invention is not limited to the above method of forming the drive electrode 6a, detection electrodes 6b and 6c, and terminal joint portions $6a_1$, $6b_1$, and $6c_1$, and various method other than the above can be used in the present invention.

Figure 20:
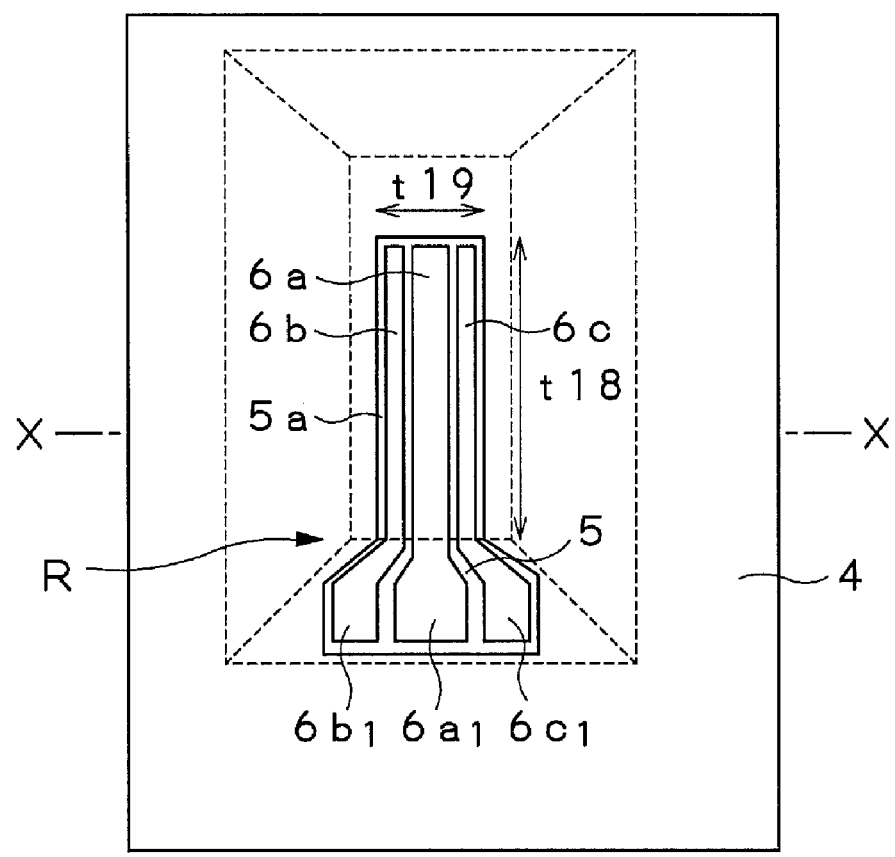
FIG. 20 is a plan view showing a state of the single-crystal silicon substrate on which a piezoelectric body has been formed.
Figure 21:
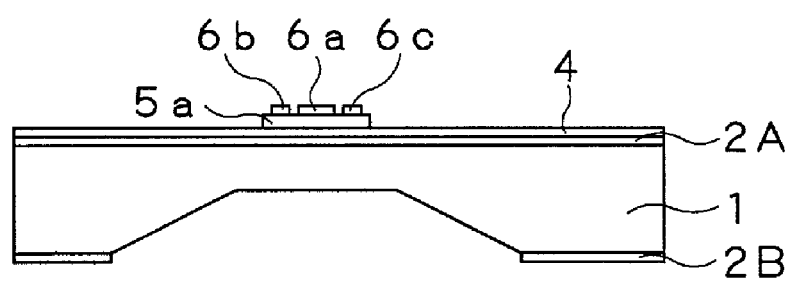
FIG. 21 is a cross-sectional view when the single-crystal silicon substrate shown in FIG. 20 is cut along the line XX.

Next, the piezoelectric film 5 is processed to form the piezoelectric body 5a on the vibrator 11. FIG. 20 is a plan view showing a state of the single-crystal silicon substrate 1 on which a piezoelectric body 5a has been formed by processing the piezoelectric film 5, and FIG. 21 is a cross-sectional view when the single-crystal silicon substrate 1 shown in FIG. 20 is cut along the line XX.

The piezoelectric body 5a can be any shape as far as it completely covers the drive electrode 6a, and detection electrodes 6b and 6c, which are formed from the upper electrode film 6.

In the present example, the length t18 of the piezoelectric body 5a is set to 2.2 mm, and the width t19 thereof is set to 90 μm. The piezoelectric body 5a having the above size is formed such that the center thereof corresponds to the center of the vibrator 11 and one edge of the piezoelectric body 5a aligns with the root line R which is a root of the vibrator 11.

The width t18 of the piezoelectric body 5a needs to be no greater than the width t4 of the vibrator 11. In the present example, the piezoelectric film 5 is allowed to remain under the aforementioned terminal joint portions $6a_1$, $6b_1$, and $6c_1$ in such a manner to run off each of the periphery of the terminal joint portions $6a_1$, $6b_1$, and $6c_1$ by 5 μm, respectively. The size of the piezoelectric film 5 allowed to remain under the aforementioned terminal joint portions $6a_1$, $6b_1$, and $6c_1$ is arbitrarily set depending on the shape and size of the entire vibration gyro sensor element 10.

In the present example, after the resist film pattern having a shape corresponding to the piezoelectric body 5a and the piezoelectric film 5 allowed to remain under the aforementioned terminal joint portions $6a_1$, $6b_1$, and $6c_1$ was formed using a photolithography technique, unnecessary portions of the piezoelectric film 5 were removed by wet etching using hydrofluoric-nitric acid solution, thereby forming the piezoelectric body 5a.

As described above, the wet etching is used to remove the unnecessary portions of the piezoelectric film 5 in order to form the piezoelectric body 5a in the present example. Alternatively, however, ion etching which is a physical etching technique or reactive ion etching (RIE) that utilizes chemical and physical effects can be used for the removal in the present invention.

Figure 22:
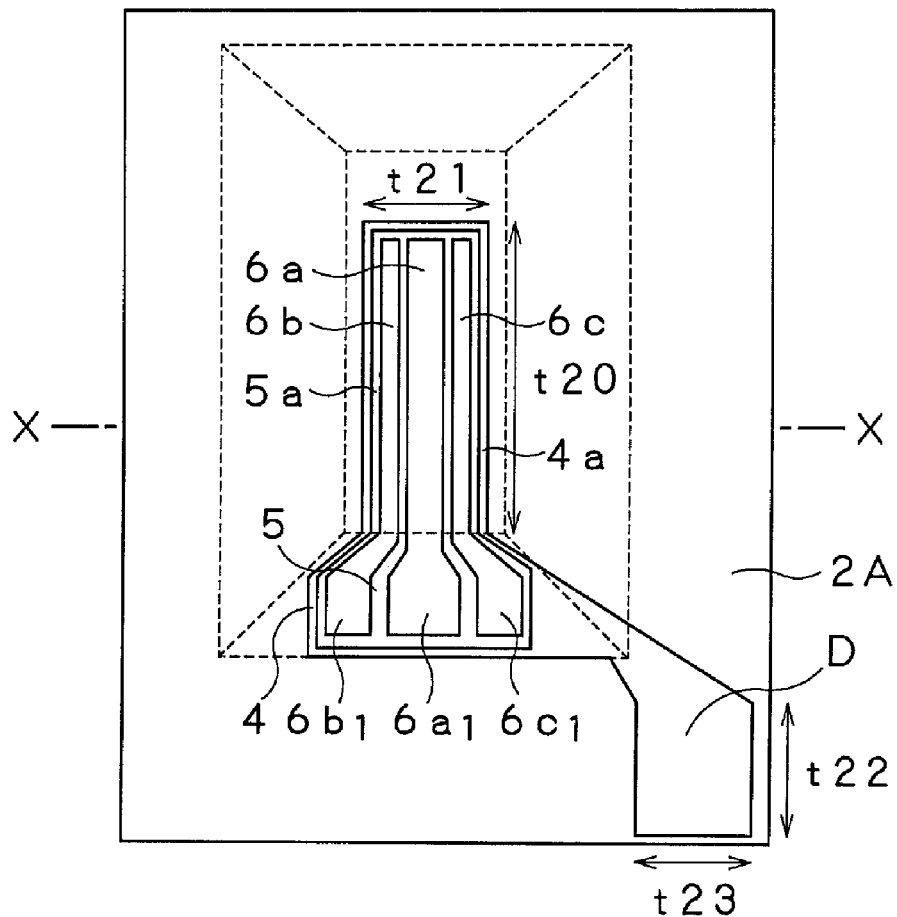
FIG. 22 is a plan view showing a state of the single-crystal silicon substrate on which a reference electrode has been formed.
Figure 23:
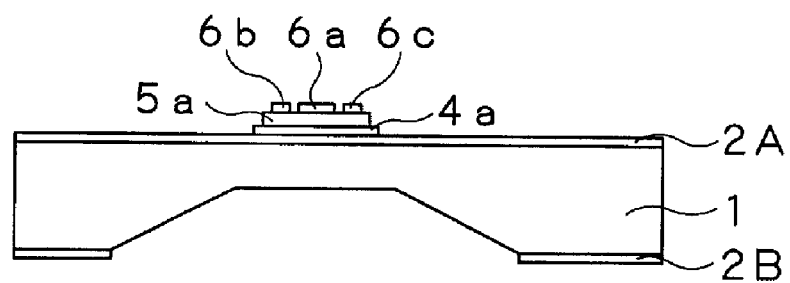
FIG. 23 is a cross-sectional view when the single-crystal silicon substrate shown in FIG. 22 is cut along the line XX.

Next, the lower electrode film 4 is processed to form the reference electrode 4a of the vibrator 11. FIG. 22 is a plan view showing a state of the single-crystal silicon substrate 1 on which the reference electrode 4a has been formed by processing the lower electrode film 4, and FIG. 23 is a cross-sectional view when the single-crystal silicon substrate 1 shown in FIG. 22 is cut along the line XX.

The reference electrode 4a can be any shape as far as it completely covers the piezoelectric body 5a formed by processing the piezoelectric film 5.

In the present example, the length t20 of the reference electrode 4a is set to 2.3 mm, and the width t21 thereof is set to 94 µm. The reference electrode 4a having the above size is formed such that the center thereof corresponds to the center of the vibrator 11 and one edge of the reference electrode 4a aligns with the root line R which is a root of the vibrator 11.

The width t20 of the reference electrode 4a needs to be no greater than the width t4 of the vibrator 11. In the present example, the lower electrode film 4 is allowed to remain under the piezoelectric film 5 that is not removed as described above in such a manner to run off the periphery of the piezoelectric film 5 by 5 µm. The size of the portion that runs off the periphery of the piezoelectric film 5 is arbitrarily set depending on the shape and size of the entire vibration gyro sensor element 10.

Further, for electrical connection between the reference electrode 4a and the outside, a wire connection terminal D is formed from the lower electrode film 4 as shown in FIG. 22. As described above, the reference electrode 4a and wire connection terminal D are electrically connected to each other through the lower electrode film 4 that is allowed to remain under the piezoelectric film 5.

In the present example, electrical connection between the vibration gyro sensor element 10 and the outside is set to be made by wire bonding, so that the area for a terminal portion of the wire connection terminal D to be actually installed should be ensured by the area needed at the wire bonding time.

In the present example, the length t22 of the wire connection terminal D is set to 200 µm, and the width t23 thereof is set to 100 µm. The connection between the vibration gyro sensor element 10 and the outside can be any configuration including the connection method. The shape of the wire connection terminal D is set depending on the connection method to be employed to obtain the optimal condition.

In the present example, after forming the resist film pattern having a shape as shown in FIG. 22 using a photolithography technique, unnecessary portions of the lower electrode film 4 were removed by ion etching, thereby forming the reference electrode 4a, wire connection terminal D, and lower electrode film 4 that electrically connects the reference electrode 4a and wire connection terminal D.

As described above, the ion etching, which is a physical etching technique, is used to remove the unnecessary portions of the lower electrode film 4 in order to form the reference electrode 4a in the present example. Alternatively, however, wet etching which is a chemical etching technique or reactive ion etching (RIE) that utilizes chemical and physical effects can be used for the removal in the present invention.

Next, a planarizing resist film 7 is formed so as to smooth electrical connection between the terminal joint portions $6a_1$, $6b_1$, and $6c_1$ formed at the one edges of the drive electrode 6a and detection electrodes 6b and 6c, and the wire connection terminals A, B, and C, respectively.

Figure 24:
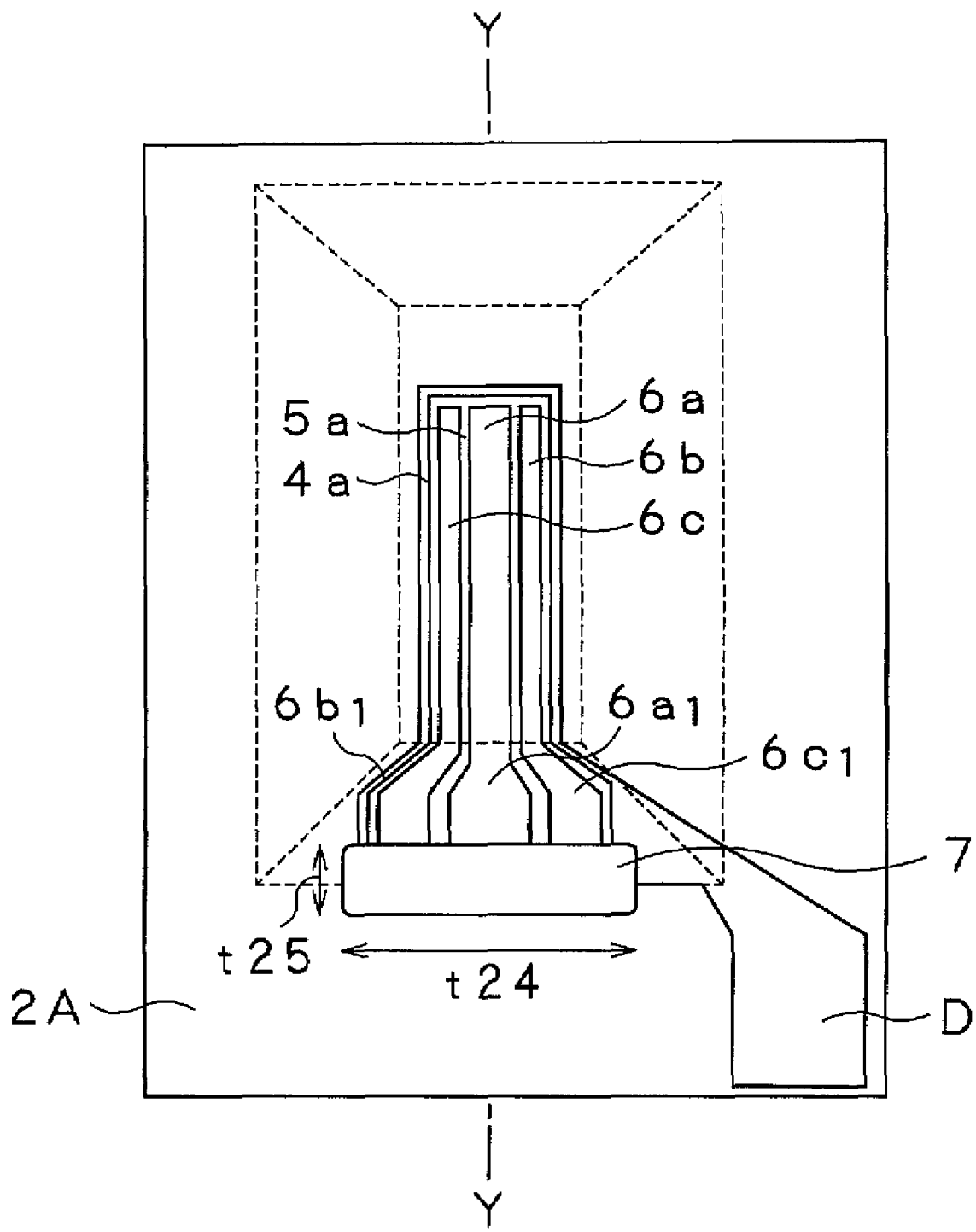
FIG. 24 is a plan view showing a state of the single-crystal silicon substrate on which a planarizing resist film has been formed.
Figure 25:
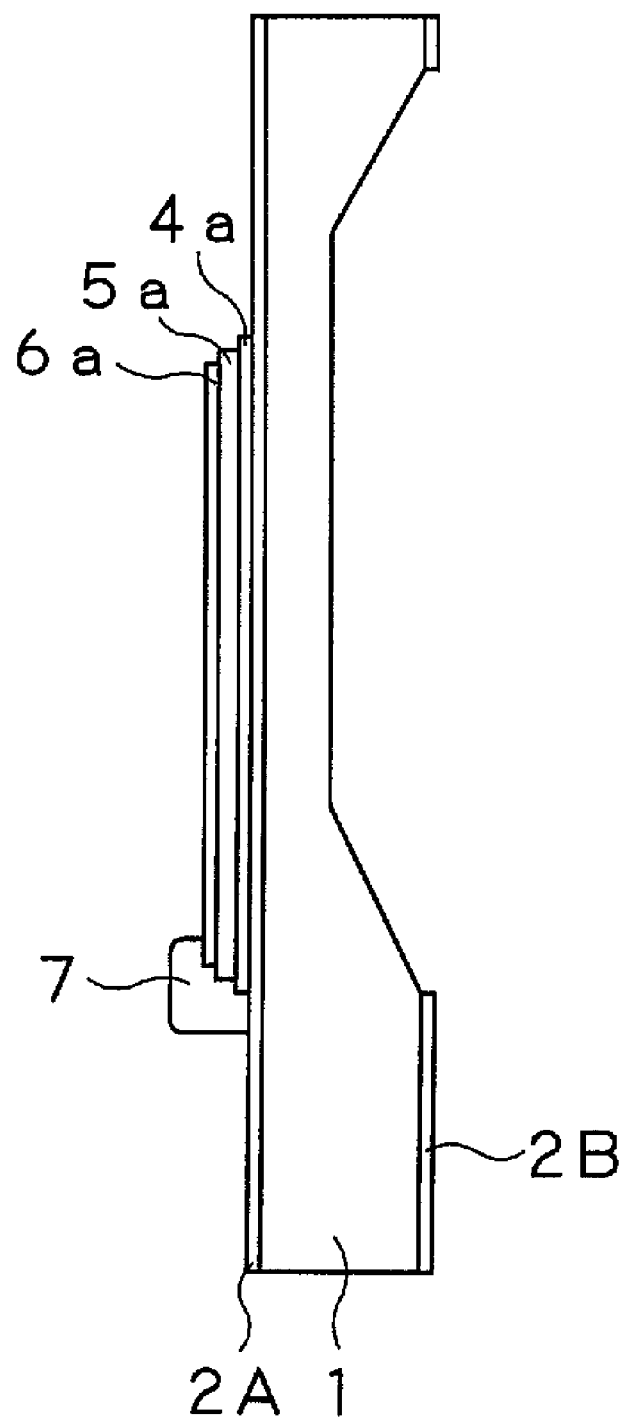
FIG. 25 is a cross-sectional view when the single-crystal silicon substrate shown in FIG. 24 is cut along the line YY.

FIG. 24 is a plan view showing a state of the single-crystal silicon substrate 1 on which the planarizing resist film 7 has been formed, and FIG. 25 is a cross-sectional view when the single-crystal silicon substrate 1 shown in FIG. 24 is cut along the line YY.

As shown in FIG. 22, the physical connection between the wire connection terminals A, B, and C and terminal joint portions $6a_1$, $6b_1$, and $6c_1$ should be made through the end portion of the piezoelectric film 5 allowed to remain when the piezoelectric body 5a is formed and the end portion of the lower electrode film 4 allowed to remain when the reference electrode 4a is formed.

In the present example, the piezoelectric body 5a is formed by etching the piezoelectric film 5 with a wet etching process. The end portion that has been subjected to the etching process becomes in a reverse tapered shape or vertical form toward the single-crystal silicon substrate 1. Therefore, when a wiring film is formed so as to electrically connect the terminal joint portions $6a_1$, $6b_1$, and $6c_1$ and the wire connection terminals A, B, and C, respectively without forming the planarizing resist film 7, the electrical connection may be released due to step of the end portion.

Further, since the end portion of the lower electrode film 4 electrically connected to the reference electrode 4a is exposed, a short-circuit may be caused between the drive electrode 6a, detection electrode 6b and 6c, and reference electrode 4a unless the planarizing resist film 7 is formed.

For the above reason, the planarizing resist film 7 is formed on the terminal joint portions $6a_1$, $6b_1$, and $6c_1$ as shown in FIG. 24 to eliminate step of the end portion of the piezoelectric film 5 and to prevent the end portion of the lower electrode film 4 from being exposed.

The planarizing resist film 7 can be formed in any shape as far as it can eliminate step of the end portion of the piezoelectric film 5 and can prevent the end portion of the lower electrode film 4 from being exposed. In the present example, the width t24 of the planarizing resist film 7 is set to 200 µm, and the length t25 thereof is set to 50 µm.

The planarizing resist film 7 is hardened by applying heat treatment of about 280 to 300° C. to the resist film that has been patterned using a photolithography technique at the portion shown in FIG. 24 in a desirable shape. While the thickness of the resist film is set to about 2 µm in the present example, it is preferable that the thickness thereof be controlled in accordance with the thicknesses of the piezoelectric film 5 and lower electrode film 4, and set to no less than the total thickness of the two. While the planarizing resist film 7 has been formed using the resist film in the present example, any material can be used with any method as far as it is a non-conducting material that can avoid the above problems.

Figure 26:
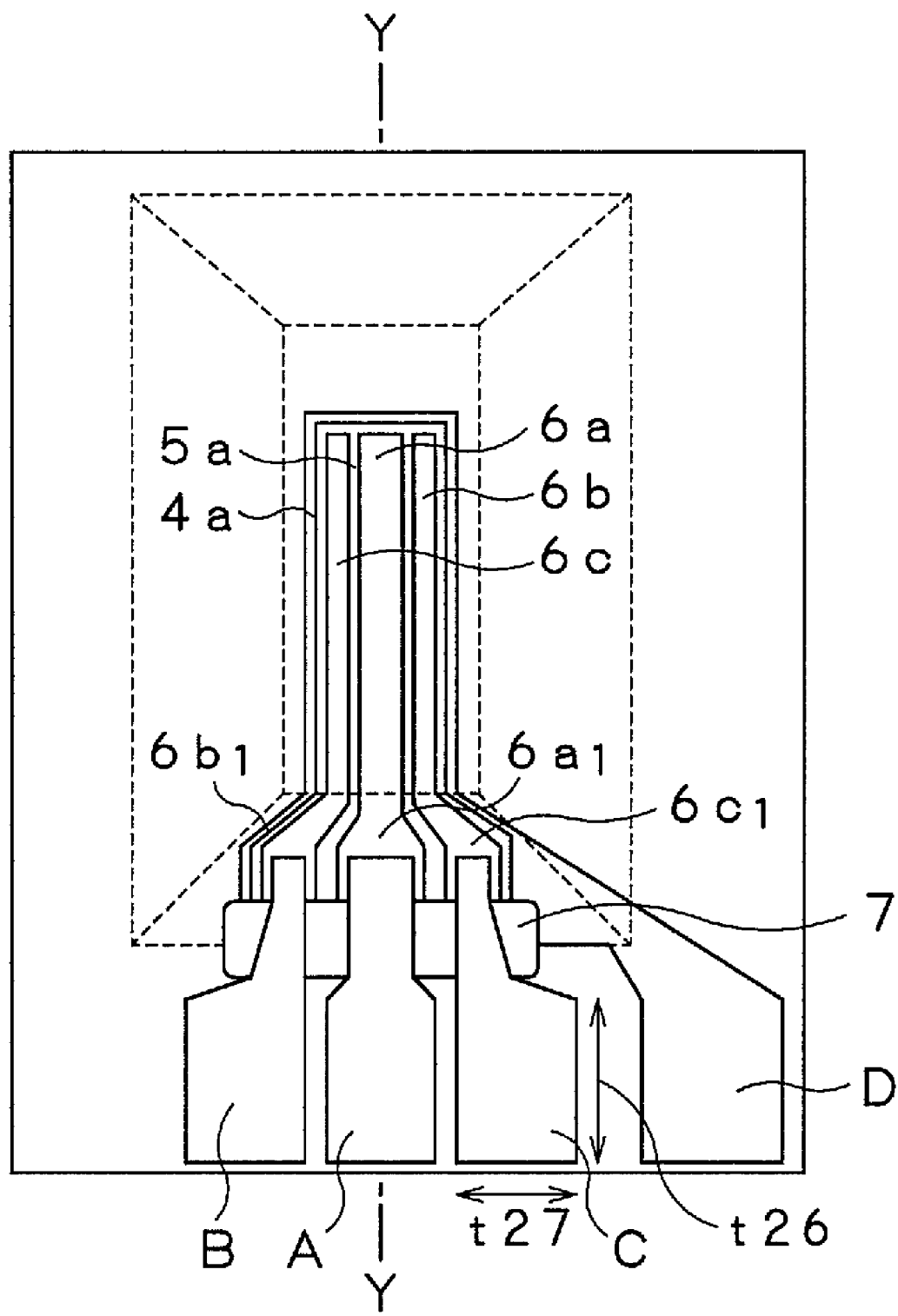
FIG. 26 is a plan view showing a state of the single-crystal silicon substrate on which wire connection terminals have been formed.
Figure 27:
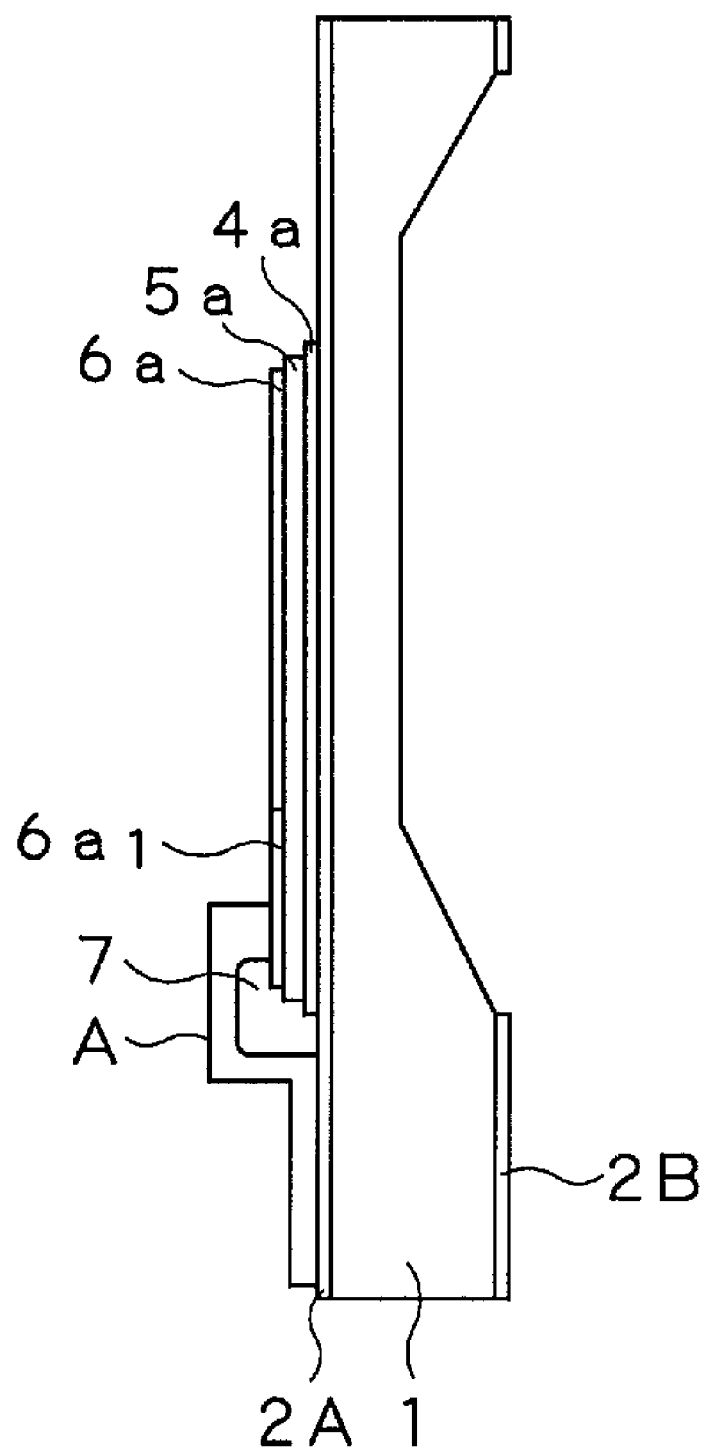
FIG. 27 is a cross-sectional view when the single-crystal silicon substrate shown in FIG. 26 is cut along the line YY.

Next, the wire connection terminals A, B, and C used in performing wiring processing for connecting the drive electrode 6a and detection electrodes 6b and 6c with the outside. FIG. 26 is a plan view showing a state of the single-crystal silicon substrate 1 on which wire connection terminals A, B, and C have been formed. FIG. 27 is a cross-sectional view when the single-crystal silicon substrate 1 shown in FIG. 26 is cut along the line YY.

The wire connection terminals A, B, and C shown in FIG. 26 are connected to the terminal joint portions $6a_1$, $6b_1$, and $6c_1$ of the drive electrode 6a, and detection electrode 6b and 6c, respectively. In the present example, electrical connection between the vibration gyro sensor element 10 and the outside is set to be made by wire bonding, so that the areas for terminal portions of the wire connection terminals A, B, and C to be actually installed should be ensured by the area needed at the wire bonding time, as in the case of the wire connection terminal D described above.

The wire connection terminals A, B, and C are formed on the thermally-oxidized film 2A in such a manner to be passed through the upper surface of the planarizing resist film 7 and be in contact with the terminal joint portions $6a_1$, $6b_1$, and $6c_1$. While the shape of each of electrode joint portions between the wire connection terminals A, B, and C, and terminal joint portions $6a_1$, $6b_1$, and $6c_1$ can be arbitrarily formed, it is preferable that the electrode joint portion have a size greater than 5 μm square.

In the wire connection terminals A, B, and C, the area for terminal portion to be actually installed is formed of the shape that can ensure the area needed at the wire bonding time, as described above.

In the present example, the length t26 of each of the terminal portions of the wire connection terminals A, B, and C is set to 200 μm, and the width t27 thereof is set to 100 μm. The connection between the vibration gyro sensor element 10 and the outside can be any configuration including the connection method. The shape of the wire connection terminals A, B, and C is set depending on the connection method to be employed to obtain the optimal condition.

In the present example, after the resist film pattern having a shape as shown in FIG. 26 had been formed by a photolithography technique, the wire connection terminals A, B, C were formed by sputtering. The film adhere to unnecessary portions in the sputtering was simultaneously removed at the time of removing the resist film pattern by so-called a lift-off method.

More specifically, the wire connection terminals A, B, and C is formed by depositing titanium (Ti) for increasing adherence by 20 nm, low cost copper (Cu) having low electrical resistance is deposited by 300 nm, and gold (Au) is deposited by 300 nm so as to facilitate connection between the wire bonding and each of the wire connection terminals A, B, and C. Any material can be used as the wire connection terminals A, B, and C and any method can be used to manufacture the wire connection terminals A, B, and C, and the present invention is not limited to the above-mentioned materials and method.

Figure 28:
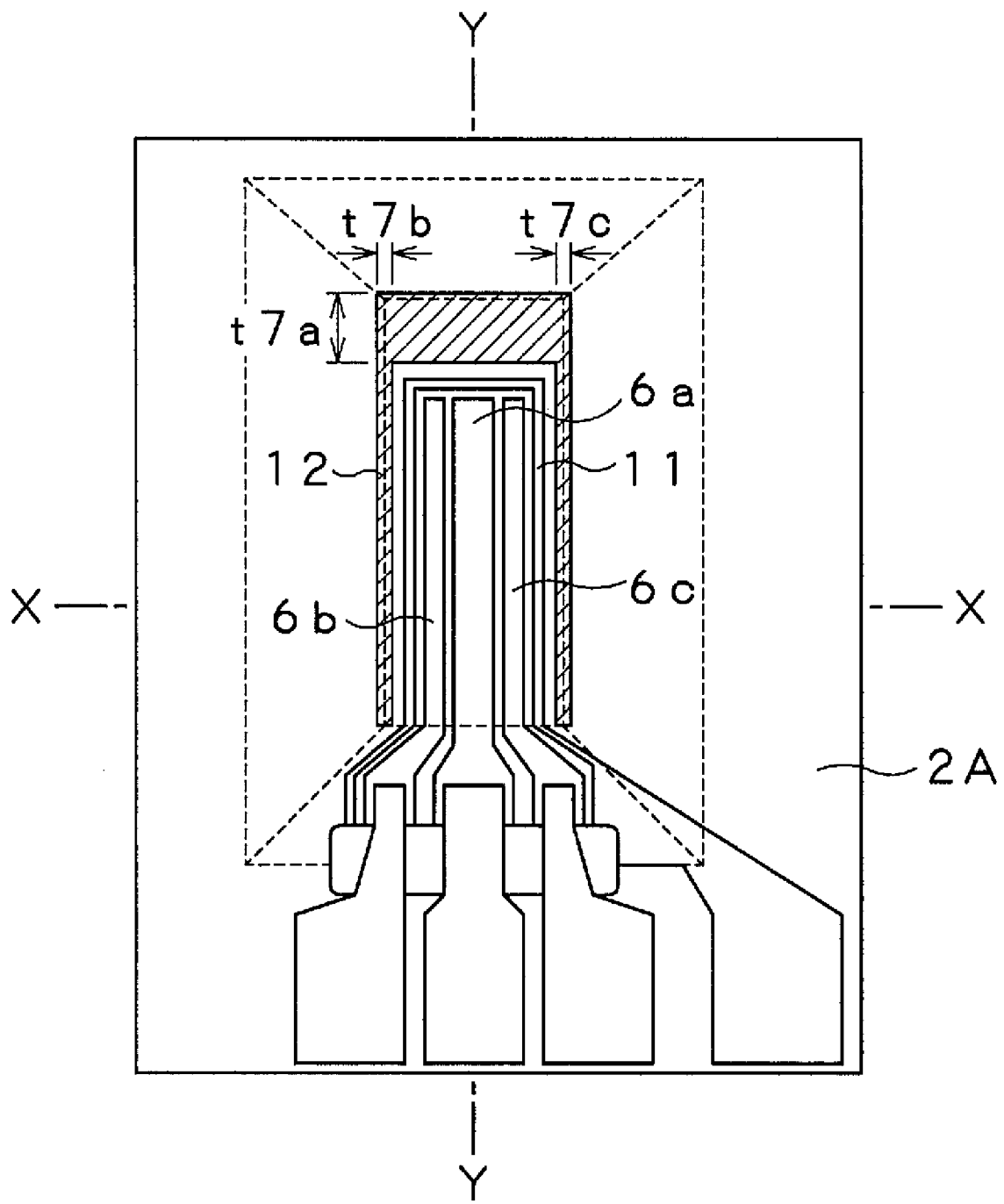
FIG. 28 is a plan view showing a state of the single-crystal silicon substrate in which a surrounding space has been formed around the vibrator by reactive ion etching.
Figure 29:
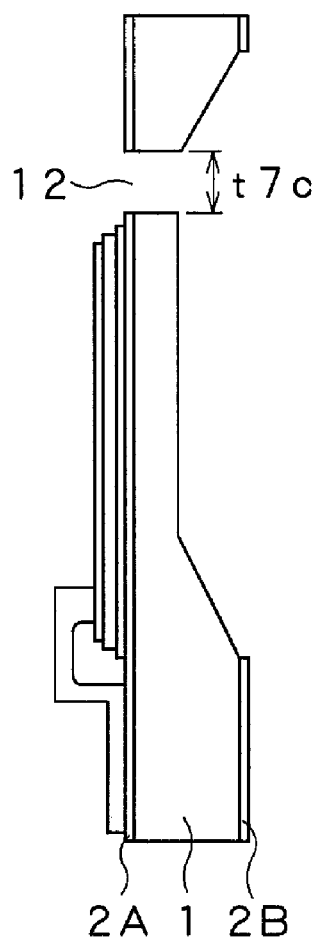
FIG. 29 is a cross-sectional view when the single-crystal silicon substrate shown in FIG. 28 is cut along the line YY.
Figure 30:
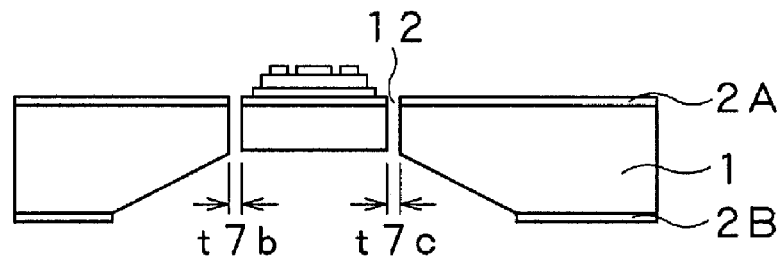
FIG. 30 is a cross-sectional view when the single-crystal silicon substrate shown in FIG. 28 is cut along the line XX.

Subsequent process is to form the surrounding space 12 for the vibration gyro sensor 10 as shown in FIG. 1, thereby obtaining the cantilever vibrator 11. FIG. 28 is a plan view showing a state where the cantilever vibrator 11 has been obtained by forming the surrounding space 12 in the single-crystal silicon substrate 1, FIG. 29 is a cross-sectional view when the single-crystal silicon substrate 1 shown in FIG. 28 is cut along the line YY, and FIG. 30 is a cross-sectional view when the single-crystal silicon substrate 1 shown in FIG. 28 is cut along the line XX.

As shown in FIG. 28, the surrounding space 12 is a U-shaped space constituted by the space having widths t7b and t7c in the left and right directions from the side surfaces of the vibrator 11 on the side where the detection electrodes 6b and 6c have been formed, and the space having a width t7a in the longitudinal direction at the end portion on the side opposite to the root line R of the vibrator 11.

In the present example, the widths t7a and t7b are set to 200 μm, respectively, which are determined based on the state of gas within the surrounding space 12 and a Q-value representing the required quality of the vibration of the vibrator 11.

In the present example, after the resist film pattern having a U-like shape as shown in FIG. 28 has been formed on the thermally-oxidized film 2A using a photolithography technology, the thermally-oxidized film 2A is removed by ion etching. While wet etching can be used to remove the thermally-oxidized film 2A, it is preferable to use the ion etching for avoiding the dimensional error due to occurrence of side etching.

Subsequently, the U-like shaped single-crystal silicon substrate 1 on which the thermally-oxidized film 2A has been removed is etched by reactive ion etching (RIE) to penetrate the single-crystal silicon substrate 1, thereby forming the surrounding space 12.

In the present example, an etching machine provided with ICP (Inductively Coupled Plasma) is used to form the vibrator 11 having vertical sidewalls according to Bosch process (Bosch company) that alternately repeats an etching process and film formation process by which a sidewall protection film for protecting a sidewall is formed on the etched portions.

According to the Bosch process, high density plasma has been generated by ICP. Further, $SF_6$ gas for etching and $C_4F_8$ gas for the protection of sidewall are alternately introduced to perform the etching process at an etching rate of about 10 μm per minute, so that the vibrator 11 having vertical sidewalls can be formed.

With the above, the formation of the piezoelectric element, shape formation, and wiring formation, which are the main manufacturing steps related to the formation of the vibration gyro sensor element 10 are terminated. Thus, as shown in FIG. 31, a plurality of (here, 5 by 3) vibration gyro sensor element 10 are formed in the single-crystal silicon substrate 1.

Figure 31:
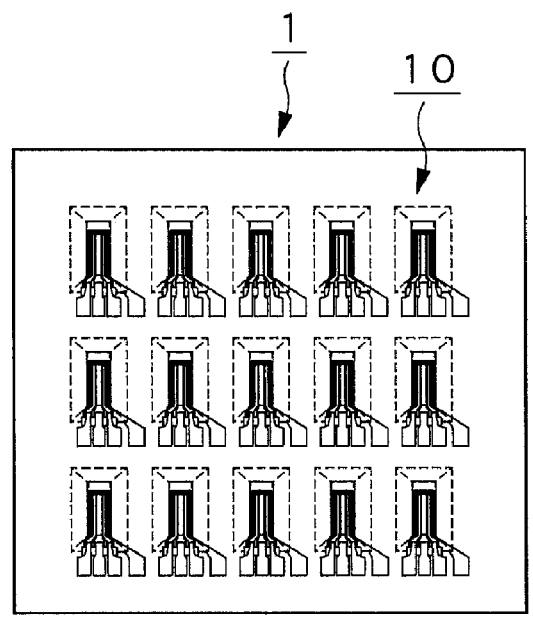
FIG. 31 is a plan view showing a state of the single-crystal silicon substrate on which a plurality of vibration gyro sensor elements have been formed.

The number of the vibration gyro sensor elements 10 to be formed in one single-crystal silicon substrate 1 is not limited to 5 by 3, as shown in FIG. 31, but is determined by the size of the vibration gyro sensor elements 10 to be designed and the arrangement pitch of the vibration gyro sensor elements 10.

In the subsequent step, the single-crystal silicon substrate 1 on which the plurality of vibration gyro sensor elements 10 have been formed is cut into respective single elements. The method used and dimension in dividing the plurality of vibration gyro sensor elements 10 formed on the single-crystal silicon substrate 1 is not particularly limited, and also the shape obtained after the division is not limited.

Figure 32:
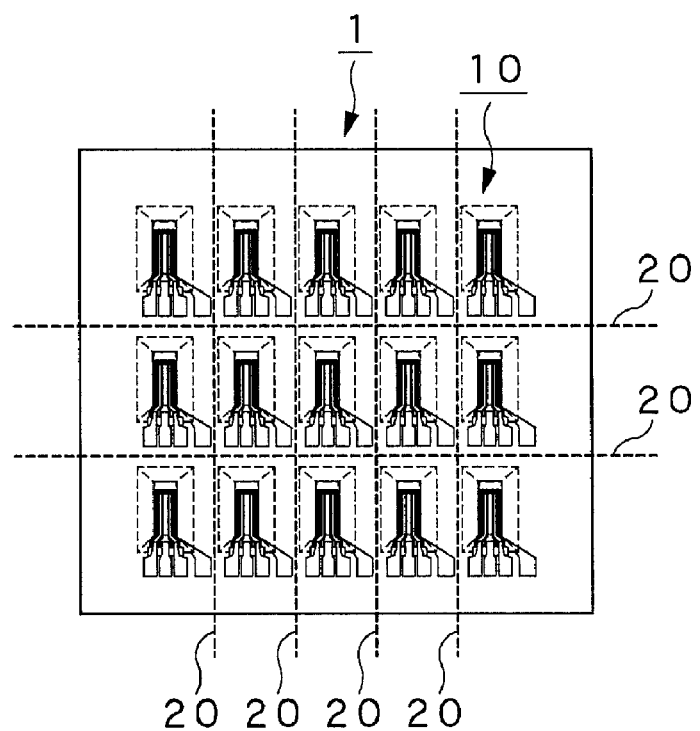
FIG. 32 is a plan view showing cutting plane lines to indicate where the plurality of vibration gyro sensor elements formed on the single-crystal silicon substrate are cut.

In the present example, after dividing marks have been created with a diamond cutter by tracing element dividing lines 20 shown in FIG. 32, the single-crystal silicon substrate 1 is directly folded by hand and respective vibration gyro sensor elements 10 are taken out. Any method can be used as a method of dividing the single-crystal silicon substrate 1. For example, it is possible to employ a method of cutting the single-crystal silicon substrate 1 by grinding with a grinding stone or cutting it using the surface orientation of the single-crystal silicon substrate 1.

Figure 33:
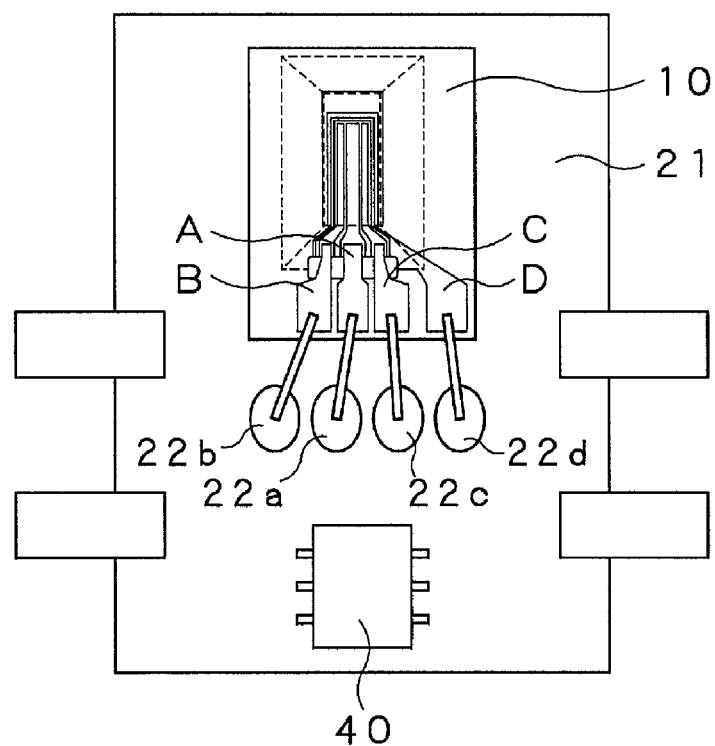
FIG. 33 is a plan view showing a state where the vibration gyro sensor elements are attached to an IC substrate.

Subsequently, as shown in FIG. 33, each of the vibration gyro sensor elements 10 obtained by dividing the single-crystal silicon substrate 1 is bonded to an IC substrate 21. The bonding method between the vibration gyro sensor element 10 and IC substrate 21 is not limited, and anaerobic adhesive is used to bond the vibration gyro sensor elements 10 to the IC substrate 21 in the present example.

After the bonding, electrical connection between the vibration gyro sensor elements 10 and the IC substrate 21 are allowed to be established. On the IC substrate 21, the IC circuit 40 described above using FIG. 2 is mounted. Further, on the IC substrate 21, a substrate terminal 22a connected to the end portion of the AGC shown in FIG. 2, substrate terminals 22b and 22c connected to the synchronous detection circuit 45, and a substrate terminal 22d connected to a not shown reference electrode are formed.

In the present example, the wire connection terminals A, B, C, and D of the vibration gyro sensor element 10 are electrically connected to the substrate terminals 22a, 22b, 22c, and 22d within the IC substrate 21, respectively using wire bonding. The connection method between them is not particularly limited, and it is possible to employ a method of forming a conducting bump used in a semiconductor as the connection method.

Figure 34:
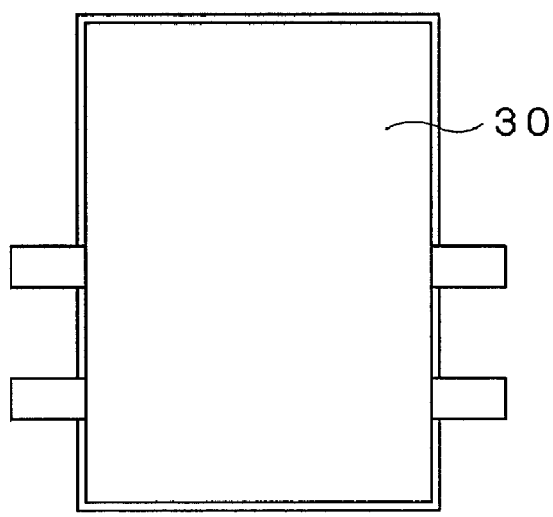
FIG. 34 is a plan view showing a state where a cover member is attached to the angular rate sensor including the vibration gyro sensor element.

Next, as shown in FIG. 34, a cover member 30 is attached to protect the vibration gyro sensor element 10 and circuit on the IC substrate 21 from the outside. While any material can be used as the cover member 30, it is desirable to use a material having shielding effect, such as SUS, in consideration of influence of the external noise. Further, the cover member 30 needs to have a shape not impeding the vibration of the vibrator 11. Thus, the angular rate sensor 50 has been completed.

When a voltage is applied to the drive electrode 6a of the vibrator 11 included in the vibration gyro sensor element 10 that constitutes the angular rate sensor 50 to allow the vibrator 11 to vibrate at a predetermined resonance frequency, the vibrator 11 vibrates in the vertical direction corresponding to the thickness direction of the vibrator 11 at a vertical resonance frequency, and, at the same time, vibrates in the horizontal direction corresponding to the width direction of the vibrator 11 at a horizontal resonance frequency.

Figure 35:
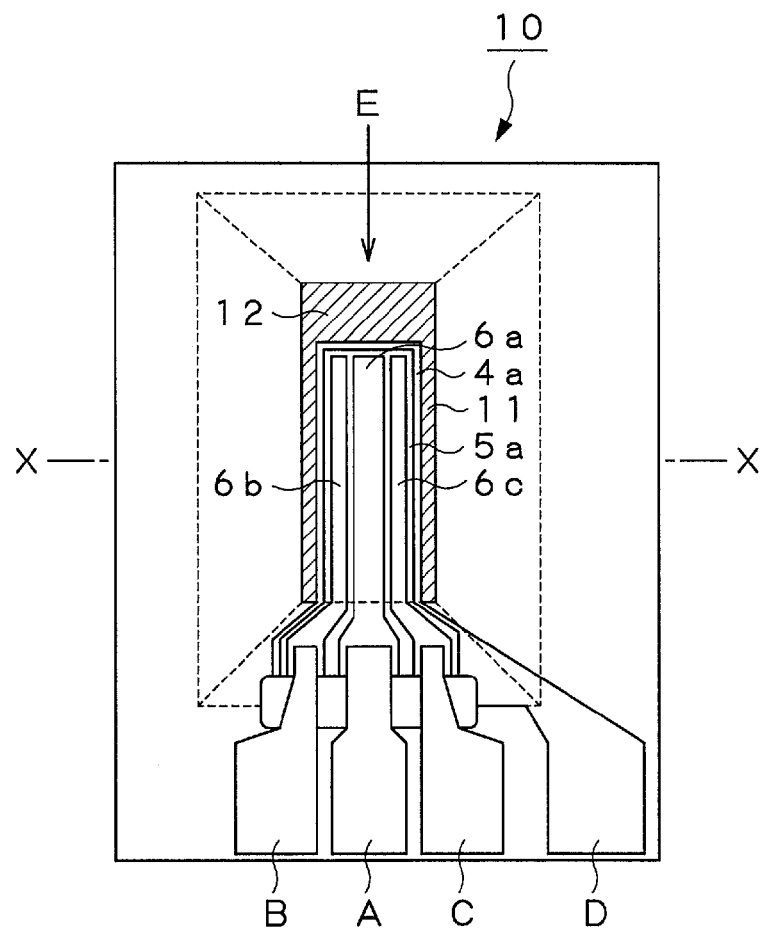
FIG. 35 is a plan view showing the vibration gyro sensor element that adjusts the shape of the vibrator by means of laser irradiation.
Figure 36:
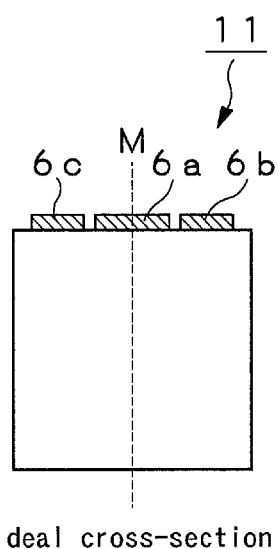
FIG. 36 is a vertical cross-sectional view of the vibrator having an ideal cross-section.

In the vibration gyro sensor element 10 shown in FIG. 35, the thickness of the vibrator 11 is determined by the crystal anisotropic etching as described above, and the side walls of the vibrator 11 are obtained by forming the U-like shaped surrounding space 12 by reactive ion etching. It is ideally desirable that the vibrator 11 be formed into a regular square pole having a square cross-section when the vibrator 11 is cut along a plane perpendicular to the longitudinal direction thereof. FIG. 36 shows an ideal cross-section obtained when the vibrator 11 is cut along the line XX shown in FIG. 35. FIG. 36 is a view showing the cross-section of the vibrator 11 viewed in the direction of an arrow E. When the vibrator 11 has an ideal cross-section, the vibrator has a shape symmetrical with respect to the central axis M.

Figure 37:
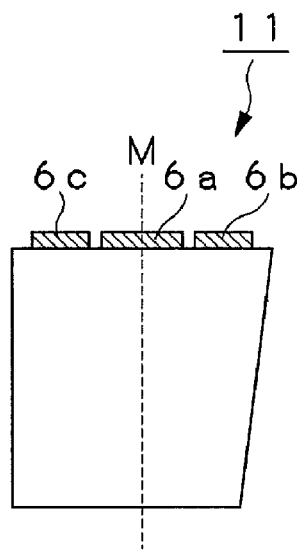
FIG. 37 is a vertical-cross sectional view of the vibrator having an asymmetrical shape with respect to the central axis.

Although it is ideally desirable that the vibrator 11 have a square cross-section, the cross-section obtained when the vibrator 11 is cut along the line XX in FIG. 35 is not symmetrical with respect to the central axis M, resulting in a trapezoid-like shape in some cases as shown in FIG. 37.

It is because that when an etching machine provided with ICP (Inductively Coupled Plasma) is used to perform reactive ion etching including Bosch process (Bosch company) that alternately repeats an etching process and sidewall protection film formation process, it is physically impossible to form the completely vertical side walls.

Figure 38:
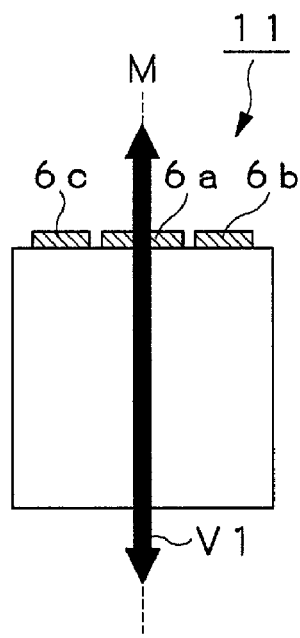
FIG. 38 is a view showing a state of the vibration caused by allowing the vibrator shown in FIG. 36 to vibrate self-excitedly.

When a voltage is applied between the reference electrode 4a and drive electrode 6a of the vibrator 11 having an ideal cross-section as shown in FIG. 36 to allow the vibrator 11 to vibrate self-excitedly, the vibrator 11 vibrates in the thickness direction of the vibrator 11 as shown in FIG. 38, that is, vibrates in vertical direction as denoted by an arrow V1 perpendicular to the surface on which the piezoelectric body 5a has been formed.

Figure 39:
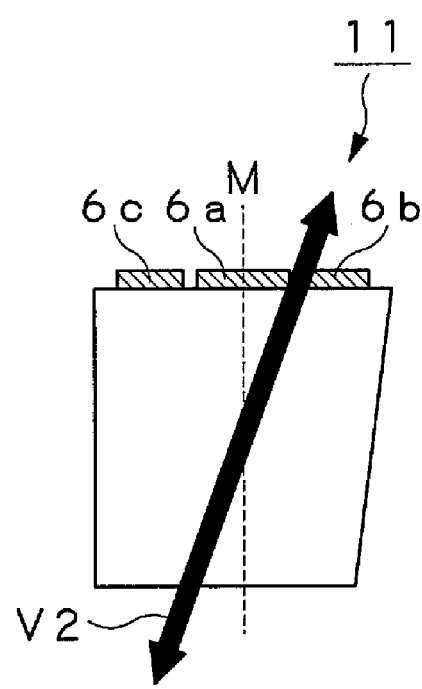
FIG. 39 is a view showing a state of the vibration caused by allowing the vibrator shown in FIG. 37 to vibrate self-excitedly.

On the other hand, when a voltage is applied between the reference electrode 4a and drive electrode 6a of the vibrator 11 whose sidewalls have been formed by reactive ion etching as shown in FIG. 37 to allow the vibrator 11 to vibrate self-excitedly, it is estimated that the vibrator 11 will vibrate in the direction denoted by an arrow V2 in FIG. 39 inclined to the detection electrode 6b side.

When the vibration direction of the vibrator 11 is inclined as described in FIG. 39, there arises a difference between detection signals detected from the detection electrodes 6b and 6c even in a state where any angular rate is not applied to the vibration gyro sensor element 10, which undermines the credibility of the value actually detected when the angular rate is applied to the vibration gyro sensor element 10. To be specific, a larger detection signal is obtained on the side to which the vibration direction is inclined. That is, in FIG. 39, the detection signal detected in the detection electrode 6b becomes larger than that detected in the detection electrode 6c.

Therefore, when the vibration gyro sensor element 10 has been formed according to the above-mentioned manufacturing method, it is necessary that the inclination of the vibration direction of the vibrator 11, which is difficult to avoid, be adjusted to close to the vibration direction obtained when the vibrator 11 has an ideal cross-section.

It is very difficult to visually determine the cross-section of the vibrator 11 for adjusting the shape of the vibrator 11 to close to the square-shape. Therefore, a voltage is applied between the reference electrode 4a and drive electrode 6a to allow the vibrator 11 to vibrate self-excitedly at a vertical resonance frequency, the detection signals of the detection electrodes 6b and 6c obtained at this time are compared to each other, and a laser light is irradiated to a desired portion of the vibrator 11 for grinding based on the detection result to change the shape of the vibrator 11, thereby adjusting the vibration direction.

For example, an Ar gas laser machine can be used as the laser machine that emits a laser light. The present invention is not limited to a type of the laser machine, and any laser machine can be used as far as it can emit a laser light.

Next, a process of irradiating a laser light for grinding to vibrator 11 included in the vibration gyro sensor element 10 shown in FIG. 35 to adjust the vibration direction will be described with reference to a flowchart of FIG. 40.

In step S1, a drive signal is input to the vibration gyro sensor element 10 to drive the vibrator 11. More specifically, a voltage is applied between the drive electrode 6a and reference electrode 4a through the wire connection terminals A and D to allow the vibrator 11 to vibrate self-excitedly at a vertical resonance frequency.

In step S2, detection signals obtained from the detection electrodes 6b and 6c when the vibrator 11 vibrates self-excitedly are measured. For simplicity of explanation, the detection signal obtained from the detection electrode 6b formed on the left side of the vibrator 11 is assumed to be a detection signal L, and the detection signal obtained from the detection electrode 6c formed on the right side of the vibrator 11 is assumed to be a detection signal R, in FIG. 35.

In step S3, the detection signal L obtained from the detection electrode 6b and the detection signal R obtained from the detection electrode 6c are compared to each other. When the detection signal L is larger than the detection signal R (detection signal L>detection signal R), the flow advances to step S4. Otherwise, the flow advances to step S5.

In step S4, a laser light is irradiated to a predetermined area of the vibrator 11 based on the comparison result of step S3 that the detection signal L is larger than the detection signal R to perform grinding operation.

Figure 41:
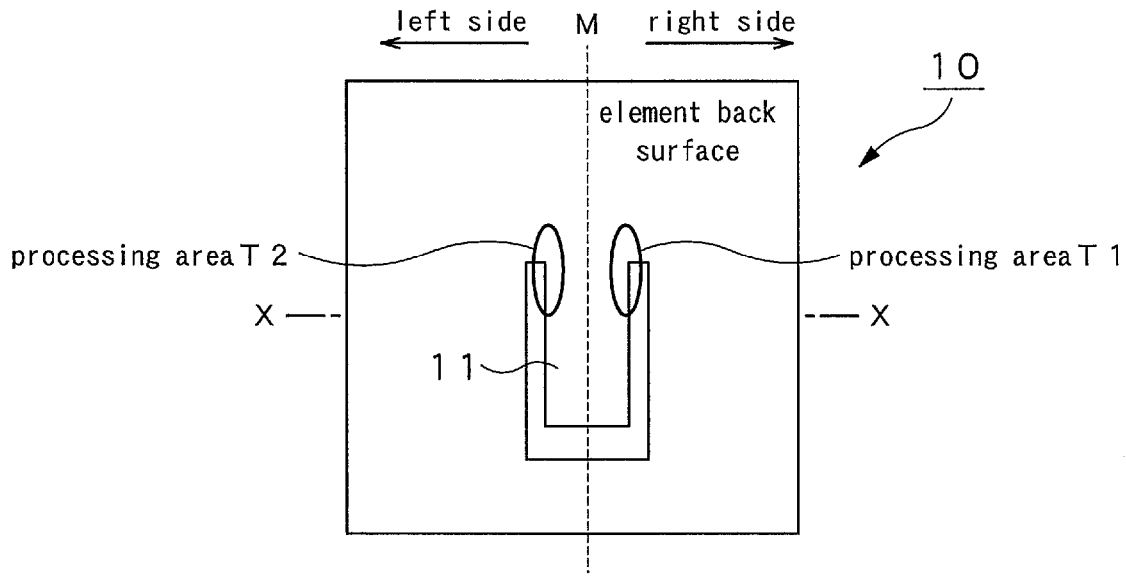
FIG. 41 is a view for explaining a processing area on the back side surface of the vibrator to be irradiated by the leaser beam.

FIG. 41 is a view when the vibration gyro sensor element 10 is rotated about the line XX in FIG. 35 by 180°, that is, a view showing the back surface of the vibration gyro sensor element 10 when the surface on which the various electrode films have been formed is assumed to be the front surface thereof.

It is basically preferable that the grinding operation using laser light irradiation to the vibrator 11 be applied to the back surface of the vibration gyro sensor element 10 shown in FIG.

41 to prevent influence on the electrode films formed on the front surface. When the detection signal L is larger than the detection signal R, the vibration direction of the vibrator 11 is inclined to the detection electrode 6b side from the axis perpendicular to the surface on which the piezoelectric body 5a has been formed, as shown in FIG. 39. That is, it is estimated that the vibrator 11 has a cross-section asymmetrical with respect to the central axis M of the vibrator 11 shown in FIG. 41.

In order to properly adjusting the vibration direction, a laser light is irradiated to a processing area T1 on the right side with respect to the central axis M shown in FIG. 41 to perform grinding operation.

Figure 42:
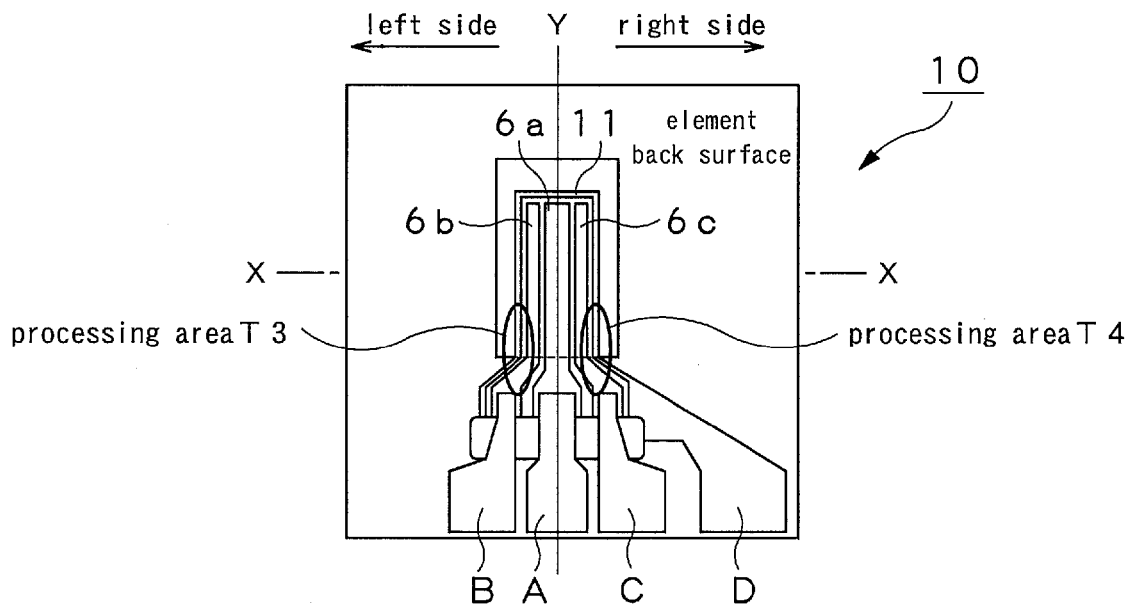
FIG. 42 is a view for explaining a processing area on the front side surface of the vibrator to be irradiated by the leaser beam.

It is also possible to adjust the vibration direction by irradiating a laser beam onto the front surface of the vibration gyro sensor element 10 on which various electrode films have been formed to grind the vibrator 11, as shown in FIG. 42. Also when a laser light is irradiated onto the front surface, a processing area of the vibrator 11 is selected based on the comparison result of the detection signals L and R, as in the case of the laser light irradiation onto the back surface. In step S4, a processing area T3 of FIG. 42 on the left side where the detection electrode 6b has been formed is set as the area to be subjected to grinding operation using laser light irradiation. At this time, laser light is irradiated such that influence on the various electrode films formed on the vibrator 11 is reduced to a minimum level.

After the grinding operation of the vibrator 11 using the laser light irradiation in step S4, the flow returns to step S2 and the above process is repeated.

In step S5, the detection signal L obtained from the detection electrode 6b and the detection signal R obtained from the detection electrode 6c are compared to each other. When the detection signal R is larger than the detection signal L (detection signal R>detection signal L), the flow advances to step S6. Otherwise, there is no difference between the detection signals L and R (detection signal R=detection signal L), so that the flow is ended.

In step S6, a laser light is irradiated to a predetermined area of the vibrator 11 based on the comparison result that the detection signal R is larger than the detection signal L to perform grinding operation.

When the detection signal R is larger than the detection signal L, the vibration direction of the vibrator 11 is inclined to the detection electrode 6c side from the axis perpendicular to the surface on which the piezoelectric body 5a has been formed, which is the opposite direction in step S4. That is, it is estimated that the vibrator 11 has a cross-section asymmetrical with respect to the central axis M of the vibrator 11 shown in FIG. 41.

In order to properly adjusting the vibration direction, a laser light is irradiated to a processing area T2 on the left side with respect to the central axis M shown in FIG. 41 to perform grinding operation.

It is also possible to adjust the vibration direction by irradiating a laser beam onto the front surface of the vibration gyro sensor element 10 on which various electrode films have been formed to grind the vibrator 11, as shown in FIG. 42. Also when a laser light is irradiated onto the front surface, a processing area of the vibrator 11 is selected based on the comparison result of the detection signals L and R, as in the case of the laser light irradiation onto the back surface. In step S6, a processing area T4 of FIG. 42 on the left side where the detection electrode 6c has been formed is set as the area to be subjected to grinding operation using laser light irradiation. At this time, laser light is irradiated such that influence on the various electrode films formed on the vibrator II is reduced to a minimum level.

After the grinding operation of the vibrator II using the laser light irradiation in step S6, the flow returns to step S2 and the above process is repeated.

Figure 40:
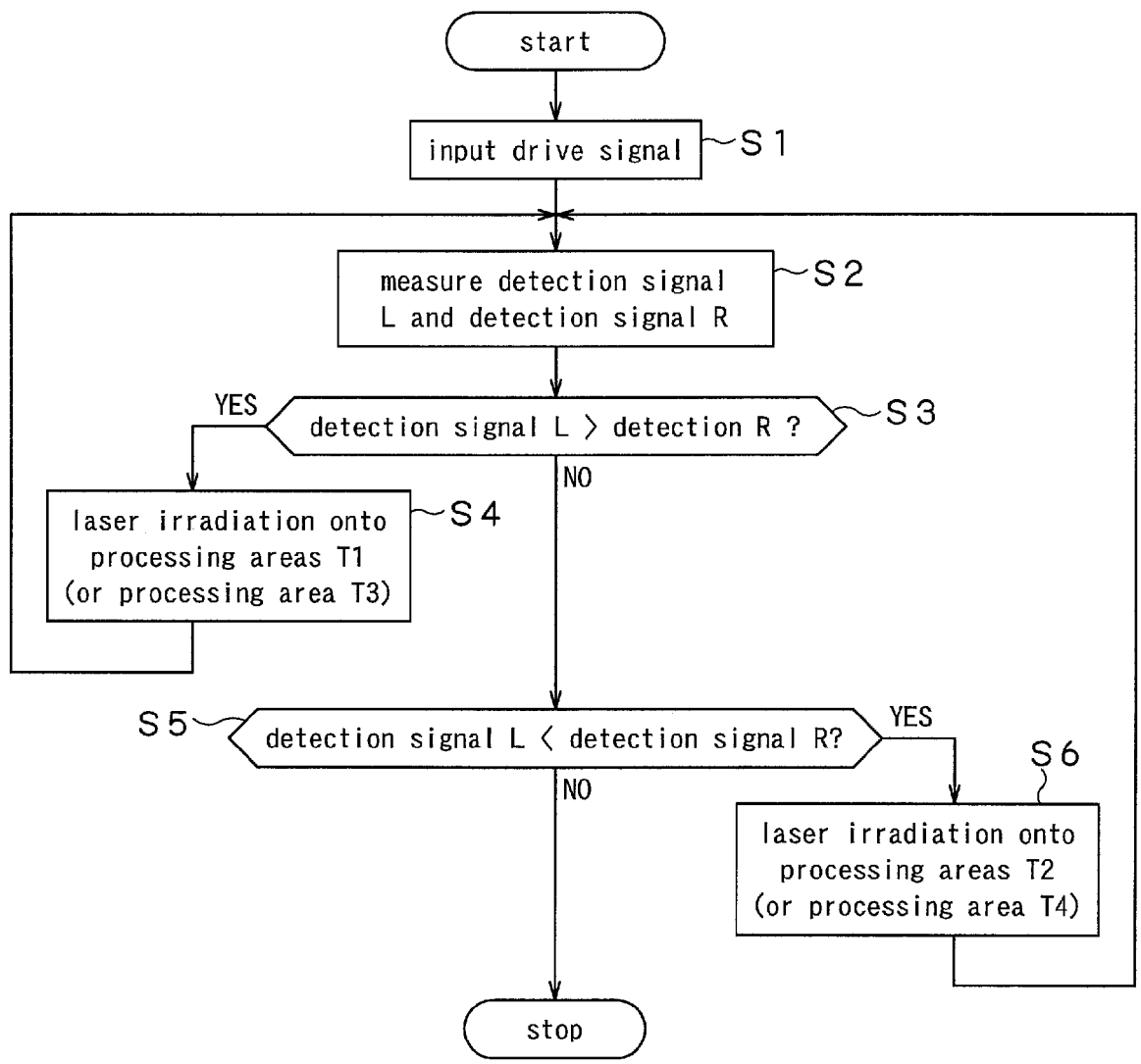
FIG. 40 is a flowchart for explaining a process to adjust the vibration direction of the vibrator by a grinding operation with respect to the vibrator with laser irradiation.

In steps S4 and S6 of the flowchart shown in FIG. 40, the areas that a laser beam is irradiated are set on the processing areas T1, T2, T3, and T4 of the vibrator 11. Looking more closely, the laser beam irradiation point in the above areas is set in the vicinity of an end portion K for fixing through which the vibrator 11 is fixed to the vibration gyro sensor element 10, or in the vicinity of the sidewall surface 11b or 11c of the vibrator 11, as shown in FIG. 43.

Figure 43:
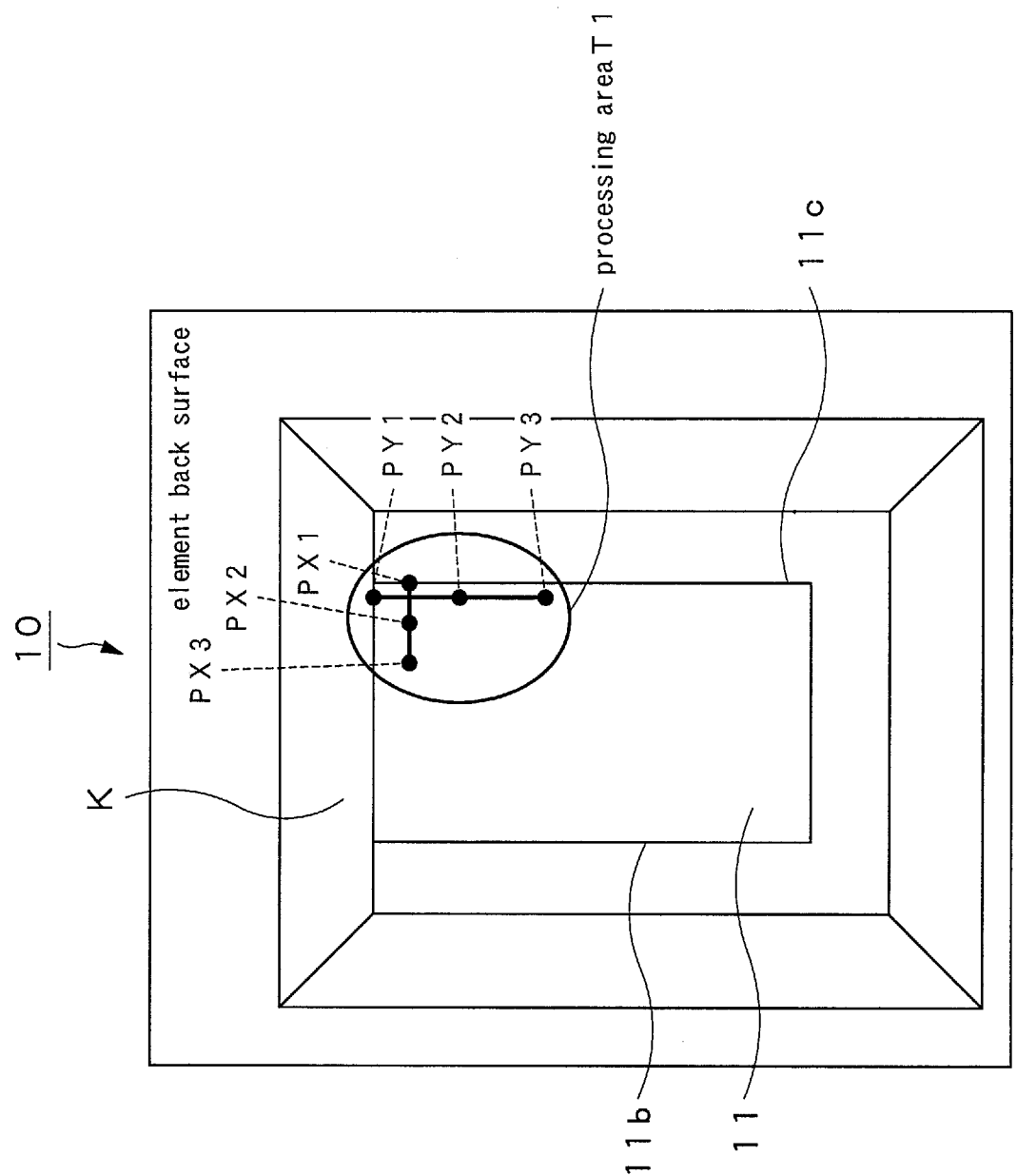
FIG. 43 is a view for explaining the irradiation point of the laser beam on the processing area of the vibrator.

It is assumed, for example, that the detection signal L detected in the vibration gyro sensor element 10 shown in FIG. 43 is larger than the detection signal R, and that a laser light is irradiated onto the processing area T1 in step S4 in the flowchart of FIG. 40. Further, at this time, it is assumed that the laser light is irradiated onto the vicinity of the end portion K for fixing or the vicinity of the sidewall surface 11c of the vibrator 11. This is because it is possible to reduce the difference between the detection signals L and R with less number of laser light irradiation operations in the case where the laser light is irradiated onto the vicinity of the end portion K or the vicinity of the sidewall surface 11b or 1c of the vibrator 11 as compared to the case where the laser light is irradiated onto the area other than the above, under the condition of the same laser irradiation power and time. In the following, a difference in the number of laser irradiation operations depending on the laser irradiation point will be described.

Figure 44:
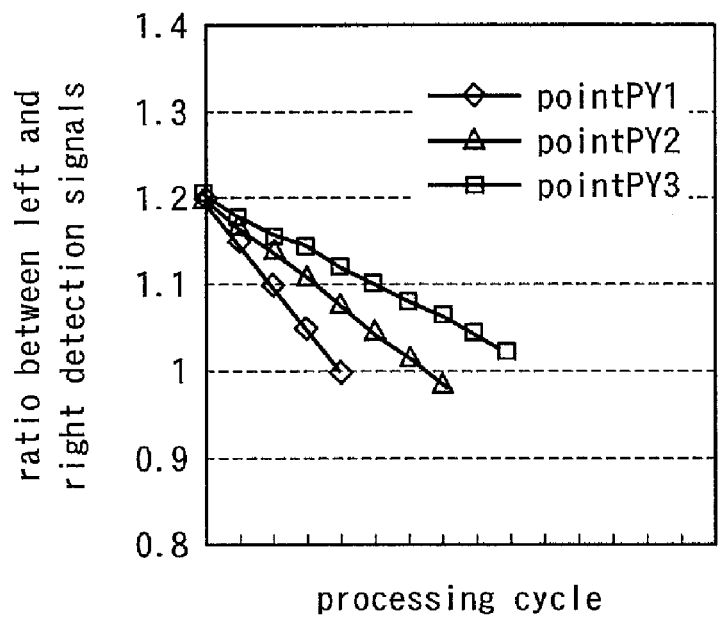
FIG. 44 is a graph showing a change in the number of processing cycles depending on the difference in the irradiation point of the laser beam.

FIG. 44 shows ratios of the detection signal L to the detection signal R obtained when a laser light is irradiated at a plurality of times onto points PY1, PY2, and PY3 along the sidewall surface 11c of the vibrator 11 starting from the vicinity of the end portion K for fixing toward the leading end of the vibrator 11 within the processing area T1 of the vibrator 11 of the vibration gyro sensor element 10 show in FIG. 43.

It can be seen from FIG. 44 that the number of processing cycles, that is, the number of the laser light irradiation operations onto the point PY1, which is closest to the end portion K for fixing is markedly less than the number of processing cycles onto the point PY3, which is farthest from the end portion K for fixing, and the laser light irradiation operations onto the point PY1 can reduce a difference between the detection signals L and R at substantially half the number of times required in the laser light irradiation operations onto the point PY3.

Figure 45:
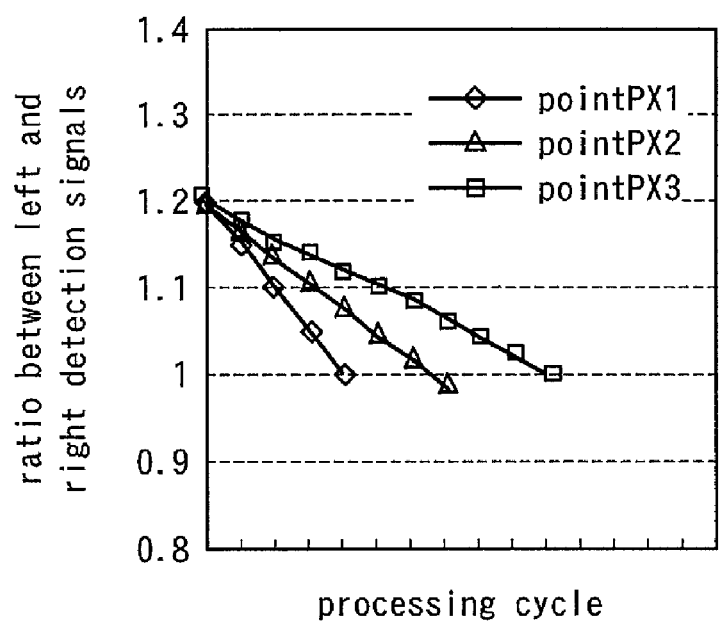
FIG. 45 is a graph showing a change in the number of processing cycles depending on the difference in the irradiation point of the laser beam.

FIG. 45 shows ratios of the detection signal L to the detection signal R obtained when a laser light is irradiated at a plurality of times onto points PX1, PX2, and PX3 along the end portion K for fixing of the vibrator 11 starting from the vicinity of the sidewall surface 11c toward the center of the vibrator 11 within the processing area T1 of the vibrator 11 of the vibration gyro sensor element 10 show in FIG. 43.

It can be seen from FIG. 45 that the number of processing cycles, that is, the number of the laser light irradiation operations onto the point PX1, which is closest to the sidewall surface 11c is markedly less than the number of processing cycles onto the point PX3, which is farthest from the sidewall surface 11c, and the laser light irradiation operations onto the point PX1 can reduce a difference between the detection signals L and R at substantially half the number of times required in the laser light irradiation operations onto the point PX3.

Therefore, after the processing area that a laser beam is irradiated has been set on the processing area T1, T2, T3 or T4, the laser irradiation point is set in the vicinity of the end portion K for fixing or in the vicinity of the sidewall surface of the vibrator 11 within the set processing area, thereby effectively reducing a difference between the detection signals L and R. Further, by setting the laser irradiation point in the vicinity of the end portion K and in the vicinity of the sidewall surface of the vibrator 11, a difference between the detection signals L and R can be reduced most effectively, thereby further reducing the number of processing cycles.

Further, in the case where a laser light is irradiated at a plurality of times, the laser irradiation point can be set not only in the same point within the processing region, but also the different points. For example, after having been set in the vicinity of the end portion K for fixing or the sidewall surface of the vibrator 11 as coarse adjustment for the first time, the laser irradiation point can be gradually away from the vicinity of the end portion K for fixing or the sidewall surface of the vibrator 11 as fine adjustment.

As described above, when there is a difference between the detection signals L and R detected when the vibrator 11 included in the vibration gyro sensor element 10 is allowed to vibrate self-excitedly at a vertical resonance frequency are compared to each other, it is estimated that the vibrator 11 has an asymmetrical cross-section and the vibrator does not vibrate self-excitedly in the thickness direction of the vibrator 11, that is, in the direction perpendicular to the plane on which the piezoelectric body 5a has been formed.

By grinding the target area of the vibrator 11 by means of the laser light irradiation based on the estimation result, it is possible to adjust the vibration direction to the thickness direction of the vibrator 11, that is, the direction perpendicular to the plane on which the piezoelectric body 5a has been formed.

In the present example, the vibration direction of the vibrator is adjusted by applying the grinding operation by means of the laser light irradiation to the vibrator of the vibration gyro sensor element 10 formed by the afore-mentioned method. The present invention is not limited to this, but can be widely applied to the vibration gyro sensor element that includes a cantilever vibrator having a lower electrode, piezoelectric thin film, and an upper electrode formed on the single-crystal silicon substrate by a thin film formation process and detects an angular rate using piezoelectric effect of the piezoelectric thin film.

What is claimed is:

1. A vibration gyro sensor element comprising:
    (a) a substrate with an opening therein; and
    (b) a cantilever vibrator formed on an extended portion of the substrate which extends into said opening along a longitudinal direction of the vibrator from a remainder of the substrate but with one end fixed to the remainder of the substrate, the cantilever vibrator having
        a lower electrode on the extended portion of the substrate;
        a piezoelectric thin film on the lower electrode;
        a drive electrode on the piezoelectric thin film and
        first and second detection electrodes on the piezoelectric thin film,
    wherein,
        said vibration gyro sensor element is configured to detect an angular rate using a piezoelectric effect of the piezoelectric thin film;
    a voltage applied to the drive electrode causes the cantilever vibrator to vibrate,
        the first and second detection electrodes extend in the longitudinal direction of the vibrator in parallel to each other and the drive electrode such that the drive electrode is positioned between the first and second detection electrodes and does not come into contact with the detection electrodes,
        the extended portion of the substrate can be ground by a laser light irradiation based on detection signals detected in the first and second detection electrodes when there is a difference between the detection signals detected in the first and second detection electrodes,
        the detection signals can be obtained when a voltage is applied between the lower electrode and the drive electrode to allow the cantilever vibrator to vibrate at a vertical resonance frequency.

2. The vibration gyro sensor element according to claim 1, wherein a position on the extended portion of the substrate where grinding by the laser light irradiation is to take place is in a vicinity of an end portion of the cantilever vibrator where the vibration is fixed.

3. The vibration gyro sensor element according to claim 1, wherein a position on the extended portion of the substrate where grinding by the laser light irradiation is to take place is in a vicinity of a sidewall surface of the extended portion of the substrate.

4. The vibration gyro sensor element according to claim 1, wherein a position on the extended portion of the substrate where grinding by the laser light irradiation is to take place is in a vicinity of an end portion of the vibrator where the vibrator is fixed and a sidewall surface of the extended portion.

5. The vibration gyro sensor element according to claim 1, wherein the opening in the substrate has trapezoidal sides with a relatively larger base side facing away from the extended portion of the substrate, and the extended portion of the substrate extending parallel to a relatively smaller top, the relatively smaller top and relatively larger base defining parallel planes.

* * * * *